United States Patent [19]

Johoji et al.

[11] Patent Number: 5,378,778
[45] Date of Patent: Jan. 3, 1995

[54] LIQUID CATALYST COMPONENT, CATALYST SYSTEM CONTAINING THE SAME, AND PROCESS FOR PRODUCING ETHYLENE-α-OLEFIN COPOLYMERS USING THE CATALYST SYSTEM

[75] Inventors: Hirofumi Johoji; Hiroyuki Shiraishi; Toshio Sasaki, all of Ichihara; Kiyoshi Kawai, Chiba, all of Japan

[73] Assignee: Sumitomo Chemical Company, Limited, Osaka, Japan

[21] Appl. No.: 235,236

[22] Filed: Apr. 29, 1994

Related U.S. Application Data

[63] Continuation of Ser. No. 961,023, Oct. 14, 1992, abandoned, which is a continuation of Ser. No. 512,453, Apr. 23, 1990, abandoned.

[30] Foreign Application Priority Data

Apr. 27, 1989 [JP] Japan .................................. 1-110414
Jun. 13, 1989 [JP] Japan .................................. 1-151032

[51] Int. Cl.⁶ ...................... C08F 4/651; C08F 210/16
[52] U.S. Cl. .................................... 526/142; 502/125; 526/161; 526/348; 526/348.5; 526/348.6; 526/348.3
[58] Field of Search ................................ 526/142, 161

[56] References Cited

U.S. PATENT DOCUMENTS

| | | | |
|---|---|---|---|
| 2,933,480 | 4/1960 | Gresham et al. | 526/336 |
| 4,452,914 | 6/1984 | Coleman et al. | 526/142 |
| 4,477,586 | 10/1984 | McDaniel . | |
| 4,528,339 | 7/1985 | Coleman, III et al. . | |
| 4,542,197 | 9/1985 | Giannini et al. . | |
| 4,542,198 | 9/1985 | Mayr et al. | 526/125 |
| 4,544,717 | 10/1985 | Mayr et al. | 526/125 |
| 4,577,001 | 3/1986 | Coleman et al. | 526/142 |

FOREIGN PATENT DOCUMENTS

| | | |
|---|---|---|
| 0271874 | 6/1988 | European Pat. Off. . |
| 2103071 | 4/1972 | France . |
| 40-15980 | 7/1965 | Japan ............. 526/161 |
| 41-5379 | 3/1966 | Japan . |
| 42-11646 | 7/1967 | Japan . |
| 42-22691 | 11/1967 | Japan . |

OTHER PUBLICATIONS

Tajima et al, J. Poly. Sci. Part-H, vol. 6, 241-242 (1968).
J. Poly. Sci., Part-A, vol. 6, 241 (1968).

*Primary Examiner*—Edward J. Smith
*Attorney, Agent, or Firm*—Stevens, Davis, Miller & Mosher

[57] ABSTRACT

A liquid catalyst component which can be used as a component of a catalyst system in combination with an organoaluminum compound (B) for producing ethylene-α-olefin copolymers.

7 Claims, 1 Drawing Sheet

FIG. 1

(A) TRANSITION METAL COMPONENT $(R^1R^2N)_{4-(m+n)}TiX_mY_n$ $\begin{pmatrix}R^1, R^2 \text{ ARE } C_1\text{-}C_{30} \text{ SATURATED HYDROCARBON}\\ \text{GROUP, X IS HALOGEN, Y IS ALKOXY,}\\ 1 \leq m \leq 3, \ 0 \leq n < 3, \ 1 \leq (m+n) \leq 3\end{pmatrix}$

$\begin{pmatrix}R^3, R^4 \text{ ARE } C_1\text{-}C_{30} \text{ HYDROCARBON GROUP}\\ \text{AND / OR ALKOXY GROUP}\end{pmatrix}$

OR HYDROXYALDEHYDE OR KETOALCOHOL
REPRESENTED BY FORMULAS (I) – (VI)

(B) ORGANOMETALLIC COMPONENT

ORGANOALUMINUM COMPOUND

→ REACTION → COPOLYMERIZATION → ETHYLENE-α-OLEFIN (-NONCONJUGATED DIENE) COPOLYMER

LIQUID CATALYST COMPONENT, CATALYST SYSTEM CONTAINING THE SAME, AND PROCESS FOR PRODUCING ETHYLENE-α-OLEFIN COPOLYMERS USING THE CATALYST SYSTEM

This application is a continuation of application Ser. No. 07/961,023, filed Oct. 14, 1992; which in turn is a continuation of application Ser. No. 07/512,453, filed Apr. 23, 1990, now abandoned.

BACKGROUND OF THE INVENTION

1. Field of the Invention

This invention relates to a liquid catalyst component, a catalyst system containing the same and a process for producing ethylene-α-olefin copolymers, using the catalyst system. More particularly, this invention relates to a liquid catalyst component, a catalyst system containing the same and a process using the catalyst system for producing ethylene-α-olefin copolymers having a narrow composition distribution and being excellent in weather resistance, colorizability, corrosion resistance, dynamic properties and solution polymerization performances.

2. Description of the Prior Art

As a process for producing ethylene-α-olefin copolymers, the method using the so-called Ziegler-Natta catalyst comprising a compound of a transition metal belonging to Group IV–VI of the periodic table and a compound of an organometal belonging to Group I–III of the periodic table is widely known generally.

On the other hand, from the viewpoint of practical properties, ethylene-α-olefin copolymers are desired to have a narrow composition distribution. Thus, they are industrially produced by the use of a catalyst system comprising a vanadium compound such as $VCl_3$, $VOCl_3$, and the like and an alkylaluminum halide.

Although such a catalyst system gives an ethylene-α-olefin copolymer having a narrow composition distribution, the catalyst system has a low polymerization activity at high temperatures, and hence it is low in productivity. Further, it has problems of coloration, deterioration in weathering and corrosion caused by the residual vanadium and chlorine, and the formed copolymer must be made free from ash sufficiently in order to prevent these problems. Further, if ethylene is copolymerized with an α-olefin having a large carbon number with this type of catalyst system, the resulting ethylene-α-olefin copolymer is so low in molecular weight as to be unsatisfactory from the viewpoint of practical properties.

In view of the above-mentioned situation, processes using a catalyst system comprising a titanium compound or a zirconium compound and an aluminum compound have hitherto been disclosed with the aim of solving these problems, and particularly in the recent time a process using a catalyst system comprising a titanium compound or a zirconium compound and an aluminoxane has been proposed.

However, the ethylene-α-olefin copolymer obtained with such a catalyst system is so low in molecular weight as to be unsatisfactory in practical properties.

On the other hand, as a process for polymerizing or copolymerizing an olefin by the use of a catalyst system comprising a compound having titanium-nitrogen bond and an organoaluminum compound, the process of polymerizing ethylene by the use of a catalyst system comprising an organoaluminum compound and a solid component prepared by supporting a titanium amide compound or an alkali metal salt of titanium amide compound on magnesium halide (DE 2030753), the process of copolymerizing ethylene and an α-olefin by the use of a catalyst system comprising a titanium amide compound having pai-aryl ligand and an aluminoxane [Japanese Patent Application Kokai (Laid-Open) No. 87-121708], a process of polymerizing ethylene or copolymerizing ethylene and α-olefin by the use of a catalyst system comprising a titanium diphenylamide compound and an organoaluminum compound (EP 0104374), a process of copolymerizing α-olefin or ethylene and α-olefin by the use of a catalyst system comprising a titanium amide compound having aryl substituent and an organoaluminum compound (Japanese Patent Publication 67-22691), a process of homopolymerizing ethylene or α-olefin or copolymerizing ethylene and α-olefin by the use of a catalyst system comprising a titanium amide compound having a lower alkyl group such as diethylaminotitanium trichloride or the like and an organoaluminum compound [Japanese Patent Publication 66-5379; J. Polym. Sci. Part A-1, 241, 6 (1968)], a process of polymerizing ethylene by the use of a catalyst system comprising tetrakis(diphenylamido)titanium and an organoaluminum compound (Japanese Patent Publication 67-11646), etc. have been disclosed.

However, if ethylene and α-olefin are copolymerized by the use of the catalyst systems disclosed above, the following disadvantages arise. Thus, The Process of DE 2030753 is disadvantageous in that the resulting ethylene-α-olefin copolymer has a broad composition distribution. The process of Japanese Patent Application Kokai (Laid-Open) No. 87-121708 is disadvantageous in that the resulting copolymer has a low molecular weight. According to the processes disclosed in EP 0104374, Japanese Patent Publication 66-5379, Japanese Patent Publication 67-22691 and J. Polym. Sci. Part A-1, 241, 6 (1968), composition distribution of the resulting copolymer is yet unsatisfactory in the narrowness. The process disclosed in Japanese Patent Publication 67-11646 is yet unsatisfactory in the narrowness of resulting copolymer and catalyst activity. Further, if ethylene and α-olefin are copolymerized with this catalyst system, a polymer insoluble in solvent is formed at the time of polymerization which is entangled with stirring wheel of reactor. This is a fatal disadvantage from the viewpoint of continuous operation of the process.

On the other hand, as a process for producing α-olefin polymers by the use of an electron donor such as diketone compound, diester compound or the like, the process of producing α-olefin polymer by the use of a catalyst system comprising an organoaluminum and a solid catalyst composed of a titanium halide, an electron donor such as a diketone or diester compound and a magnesium halide is known, for example [Japanese Patent Application Kokai (Laid-Open) No. 82-151603]. However, if ethylene/α-olefin copolymerization is carried out with this catalyst system, the resulting copolymer is so broad in composition distribution that its practical properties are unsatisfactory.

SUMMARY OF THE INVENTION

In view of the above-mentioned situation, an object of this invention is to provide a novel liquid catalyst component, a catalyst system containing the liquid catalyst component and a process using the catalyst system for producing ethylene-α-olefin copolymers which is improved in ethylene/α-olefin copolymerization performance and can give a copolymer having a narrow composition distribution, a high molecular weight, an excellent weather resistance, an excellent colorizability, a high corrosion resistance and a high solution polymerization performance.

According to the present invention, there is provided a liquid catalyst component (A) for use in the production of ethylene-α-olefin copolymers obtained by reacting:

(a) a titanium compound represented by the following general formula:

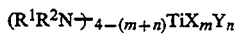

wherein $R^1$ and $R^2$ same or different from each other, represent a hydrocarbon group having 1 to 30 carbon atoms; X represents halogen; Y represents an alkoxy group; m represents a number satisfying $1 \leq m \leq 3$; and n represents a number satisfying $0 \leq n < 3$ provided that (m+n) satisfies $1 \leq (m+n) \leq 3$; with (b) at least one compound selected from the compounds represented by the following general formula:

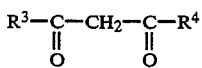

wherein $R^3$ and $R^4$, same or different from each other each represents a hydrocarbon group having 1 to 30 carbon atoms and/or an alkoxy group having 1 to 30 carbon atoms; or by reacting: (a) with (c) at least one compound selected from the hydroxyaldehydes and ketoalcohols having both carbonyl group and hydroxyl group in their molecule which are represented by the following general formulas (I) to (VI):

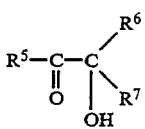 (I)

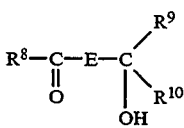 (II)

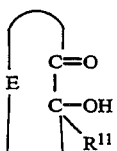 (III)

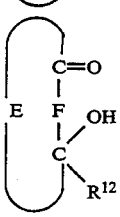 (IV)

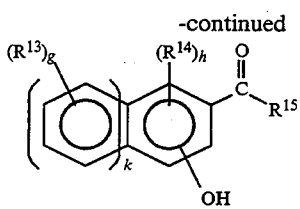 (V)

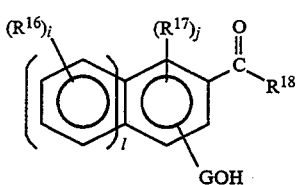 (VI)

wherein $R^5$ to $R^{18}$ each represents a hydrocarbon group having 1 to 30 carbon atoms and/or a hydrogen atom; E, F and G each represents a straight or branched hydrocarbon chain having 1 to 30 carbon atoms, provided that said hydrocarbon chain may optionally have an unsaturated bond; g, h, i and j each represents a number of 1 to 4; and k and l each represents a number of 0 to 2.

Further, according to this invention, there are also provided a catalyst system for use in the production of ethylene-α-olefin copolymers which can be obtained by reacting said liquid catalyst component with an organoaluminum compound, as well as a process for producing said copolymers by the use of said catalyst system.

BRIEF DESCRIPTION OF THE DRAWING

FIG. 1 is a flow chart diagram for facilitating understanding of this invention. This flow chart diagram is a mere typical example of the embodiment of this invention, and this invention is by no means limited by it.

DETAILED DESCRIPTION OF THE INVENTION

Hereunder, this invention will be illustrated in more detail.

The titanium compound (a) used in this invention for the synthesis of catalyst component (A) is represented by general formula $(R^1R^2N)_{4-(m+n)}TiX_mY_n$, wherein $R^1$ and $R^2$, same or different from each other, each represents a hydrocarbon group having 1 to 30 carbon atoms; X represents halogen; Y represents an alkoxy group; m represents a number satisfying $1 \leq m \leq 3$; and n represents a number satisfying $0 \leq n < 3$, preferably $0.5 \leq n \leq 2$, provided that (m+n) satisfies $1 \leq (m+n) \leq 3$.

Concrete examples of the preferable titanium compound include dimethylamidotitanium trichloride, bis(dimethylamido)titanium dichloride, tris(dimethylamido)titanium chloride, diethylamidotitanium trichloride, bis(diethylamido)titanium dichloride, tris(diethylamido)titanium chloride, di-isopropylamidotitanium trichloride, bis(di-isopropylamido)titanium dichloride, tris(di-isopropylamido)titanium chloride, di-isobutylamidotitanium trichloride, bis(di-isobutylamido)titanium dichloride, tris(di-isobutylamido)titanium chloride, di-tert-butylamidotitanium trichloride, bis(di-tertbutylamido)titanium dichloride, tris(di-tert-butylamido)titanium chloride, dibutylamidotitanium trichloride, bis(dibutylamido)titanium dichloride, tris(dibutylamido)titanium chloride, dihexylamidotitanium trichloride, bis(dihexylamido)titanium dichloride, tris(dihexylamido)titanium chloride, dioctylamidotitanium trichloride, bis(dioctylamido)titanium dichloride, tris(dioctylamido)titanium chloride, didecylamidotitanium trichloride, bis(didecylamido)titanium dichloride, tris(didecylamido)titanium chloride, dioctadecylamidotitanium trichloride, bis(dioctadecylamido)titanium dichloride, tris(dioctadecylamido)titanium chloride, diallylamidotitanium trichloride, bis(diallylamido)titanium dichloride, tris(diallylamido)titanium chloride, dipropenylamidotitanium trichloride, bis(dipropenylamido)titanium dichloride, tris(dipropenylamido)titanium chloride, ethoxy(dimethylamido)titanium dichloride, ethoxy(dioctylamido)titanium dichloride, butoxy(dioctylamido)titanium dichloride, hexyloxy(dioctylamido)titanium dichloride, 2-ethylhexyloxy(dioctylamido)titanium dichloride, didecyloxy(dioctylamido)titanium dichloride, ethoxy(didecylamido)titanium dichloride, hexyloxy(didecylamido)titanium dichloride, 2-ethylhexyloxy(didecylamido)titanium dichloride, decyloxy(dioctylamido)titanium dichloride, ethoxy(dioctadecylamido)titanium dichloride, 2-ethylhexyloxy(dioctadecylamido)titanium dichloride, decyloxy(dioctylamido)titanium dichloride, hexyloxybis(dioctylamido)titanium chloride, 2-ethylhexyloxybis(dioctylamido)titanium chloride, decyloxybis(dioctylamido)titanium chloride, hexyloxybis(didecylamido)titanium chloride, 2-ethylhexyloxybis(didecylamido)titanium chloride, decyloxybis(didecylamido)titanium chloride, and the like.

Among these titanium compounds, composition distribution becomes more narrow when $R^1$ and $R^2$ each represents straight chain hydrocarbon groups. Accordingly, the following compounds are more preferable among the above-mentioned ones: dimethylamidotitanium trichloride, bis(dimethylamido)titanium dichloride, tris(dimethylamido)titanium chloride, dibutylamidotitanium trichloride, bis(dibutylamido)titanium dichloride, tris(dibutylamido)titanium chloride, dioctylamidotitanium trichloride, bis(dioctylamido)titanium dichloride, tris(dioctylamido)titanium chloride, didecylamidotitanium trichloride, bis(didecylamido)titanium dichloride, tris(didecylamido)titanium chloride, dioctadecylamidotitanium trichloride, bis(dioctadecylamido)titanium dichloride, tris(dioctadecylamido)titanium chloride, ethoxy(dioctylamido)titanium dichloride, ethoxy(didecylamido)titanium dichloride, ethoxy(dioctadecylamido)titanium dichloride, and the like. Further, among these titanium compounds, those wherein $R^1$ and $R^2$ are straight chain aliphatic saturated hydrocarbon groups and particularly those having 8 or more carbon atoms are liquid substances and the composition distribution of the resulting copolymer is more narrow. Accordingly, as particularly preferable titanium compound, the followings can be referred to: dioctylamidotitanium trichloride, bis(dioctylamido)titanium dichloride, tris(dioctylamido)titanium chloride, didecylamidotitanium trichloride, bis(didecylamido)titanium dichloride, tris(didecylamido)titanium chloride, dioctadecylamidotitanium trichloride, bis(dioctadecylamido)titanium dichloride, tris(dioctadecylamido)titanium chloride, 2-ethylhexyloxy(didecylamido)titanium dichloride, decyloxy(dioctylamido)titanium dichloride, ethoxy(dioctadecylamido)titanium dichloride, and the like.

This invention is by no means limited by the compounds mentioned above.

As the method for synthesizing a secondary amide group-containing transition metal compound, the methods mentioned in Japanese Patent Publication No. 67-11646; H. Buerger et al.: J. Organometal. Chem. 108 (1976) 69-84; H. Buerger et al.: J. Organomet. Chem. 20 (1969) 129-139; etc. can be used.

In this invention, the synthesis was carried out by first reacting (i) a secondary amine compound represented by general formula $R^{19}R^{20}NH$ wherein $R^{19}$ and $R^{20}$ each represents a saturated hydrocarbon group having 8 to 30 carbon atoms (from the viewpoint of obtaining a liquid titanium compound, $R^{19}$ and $R^{20}$ preferably each represents an aliphatic saturated hydrocarbon group having 8 to 30 carbon atoms and more preferably a straight chain aliphatic saturated hydrocarbon group having 8 to 30 carbon atoms) and (ii) an alkyl-(alkali metal) represented by general formula $R^{21}M$ wherein $R^{21}$ represents a hydrocarbon group having 1 to 30 carbon atoms and M represents an alkali metal such as Li, K and the like, to form an amide compound of alkali metal, and thereafter reacting said amide compound of alkali metal with (iii) titanium tetrahalide represented by TiX$_4$ wherein X represents a halogen such as chlorine, bromine, iodine and the like and preferably chlorine.

In the next place, the compound (b) used in this invention for the synthesis of catalyst component (A) is represented by the following general formula:

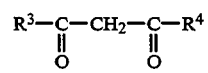

wherein $R^3$ and $R^4$, same or different from each other, each represents a hydrocarbon group having 1 to 30 carbon atoms and/or an alkoxyl group having 1 to 30 carbon atoms.

Next, the compound (c) used in this invention for the synthesis of catalyst component (A) is at least one compound selected from the group consisting of the hydroxyaldehydes and ketoalcohols having both carbonyl group and hydroxyl group in their molecule represented by the following general formulas (I) to (VI):

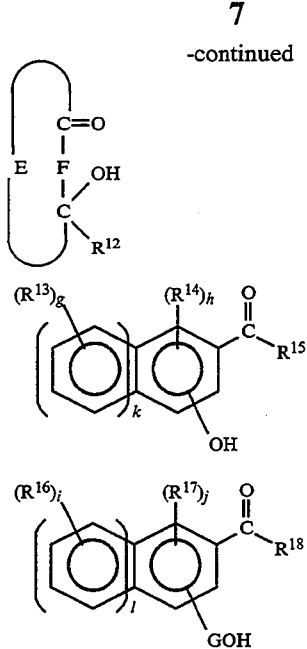

wherein $R^5$ to $R^{18}$ each represents a hydrocarbon group having 1 to 30 carbon atoms and/or a hydrogen atom; E, F and G each represents a straight or branched hydrocarbon chain having 1 to 30 carbon atoms, provided that said hydrocarbon chain may optionally have an unsaturated bond; g, h, i and j each represents a number of 1 to 4; and k and l each represents a number of 0 to 2.

As concrete examples of said compound (b), the following can be referred to:

β-diketone compounds such as $CH_3(CO)CH_2(CO)CH_3$, $CH_3(CO)CH_2(CO)C_2H_5$, $CH_3(CO)CH_2(CO)C_3H_7$, $CH_3(CO)CH_2(CO)(iso-C_3H_7)$, $CH_3(CO)CH_2(CO)C_4H_9$, $CH_3(CO)CH_2(CO)C_6H_{13}$, $CH_3(CO)CH_2(CO)C_{10}H_{21}$, $CH_3(CO)CH_2(CO)(cyclo-C_6H_{12})$, $C_2H_5(CO)CH_2(CO)C_2H_5$, $C_2H_5(CO)CH_2(CO)C_3H_7$, $C_2H_5(CO)CH_2(CO)C_4H_9$, $C_2H_5(CO)CH_2(C_0)C_6H_{13}$, $C_2H_5(CO)CH_2(CO)C_{10}H_{21}$, $C_2H_5(CO)CH_2(C_0)C_{12}H_{25}$, $C_2H_5(CO)CH_2(CO)(cyclo-C_6H_{12})$, $C_6H_{13}(CO)CH_2(CO)CH_3$, $C_6H_{13}(CO)CH_2(CO)C_3H_7$, $C_6H_{13}(CO)CH_2(CO)(iso-C_3H_7)$, $C_6H_{13}(CO)CH_2(CO)(tert-C_4H_9)$, $C_6H_{13}(CO)CH_2(CO)C_6H_{13}$, $C_6H_{13}(CO)CH_2(CO)(cyclo-C_6H_{12})$, cyclo-$C_6H_{12}(CO)CH_2(CO)(cyclo-C_6H_{12})$, $CH_3(CO)CH_2(CO)CH=CH_2$, $CH_3(CO)CH_2(CO)CH_2-CH=CH_2$, $CH_3(CO)CH_2(CO)-(CH_2)_2CH=CH_2$, $CH_3(CO)CH_2(CO)(CH_2)_4CH=CH_2$, $CH_3(CO)CH_2(CO)-C(CH_3)=CH_2$, $CH_3(CO)CH_2(CO)CH_2-C(CH_3)=CH_2$, $CH_3(CO)CH_2(CO)-CH=CH-CH_3$, $C_2H_5(CO)CH_2(CO)CH=CH_2$, $C_2H_5(CO)CH_2(CO)(CH_2)_2CH=CH_2$, $C_2H_5(CO)CH_2(CO)-C(CH_3)=CH_2$, $C_2H_5(CO)CH_2(CO)CH_2-CH=CH_2$, $C_4H_9(CO)CH_2(CO)CH=CH_2$, $C_4H_9(CO)CH_2(CO)C(CH_3)=CH_2$, $C_6H_{13}(CO)CH_2(CO)CH=CH_2$, $C_6H_{13}(CO)CH_2(CO)CH_2-CH=CH_2$, cyclo-$C_6H_{12}(CO)CH_2(CO)CH=CH_2$, $C_{10}H_{21}(CO)CH_2(CO)CH=CH_2$, $C_{10}H_{21}(CO)CH_2(CO)C(CH_3)=CH_2$, $CH_3(CO)CH_2(CO)C_6H_5$, $C_2H_5(CO)CH_2(CO)C_6H_5$, $C_3H_7(CO)CH_2(CO)C_6H_5$, $(iso-C_3H_7)(CO)CH_2(CO)C_6H_5$, $C_4H_9(CO)CH_2(CO)C_6H_5$, $(tert-C_4H_9)(CO)CH_2(CO)C_6H_5$, $C_6H_{13}(CO)CH_2(CO)C_6H_5$, $C_{10}H_{21}(CO)CH_2(CO)C_6H_5$, (Cyclo-$C_6H_{12})(CO)CH_2(CO)C_6H_5$, $CH_3(CO)CH_2(CO)C_{12}H_{10}$, $C_3H_7(CO)CH_2(CO)C_{12}H_{10}$, $C_4H_9(CO)CH_2(CO)C_{12}H10$, $C_{10}H_{21}(CO)CH_2(CO)C_{12}H_{10}$, $C_{12}H_{25}(CO)CH_2(CO)C_{12}H10$, $CH_2=CH(CO)CH_2(CO)CH=CH_2$, $CH_2=CH(CO)CH_2(CO)CH_2-CH=CH_2$, $CH_2=CH(CO)CH_2(CO)CH_2-CH=CH_2$, $CH_2=CH(CO)CH_2(CO)(CH_2)_2CH=CH_2$, $CH_2=CH(CO)C(CH_3)CH=CH_2$, $CH_2=CH(CH_3)C(CO)CH_2(CO)C(CH_3)CH=CH_2$, $CH_2=CH(CO)CH_2(CO)C_6H_5$, $CH_2=CH(CH_3)C-(CO)CH_2(CO)C_6H_5$, $C_4H_9-CH=CH-CH_2(CO)CH_2(CO)C_6H_5$, $CH_2=CH(CO)CH_2(CO)C_{12}H_{10}$, $CH_2=CH(CH_3)C-(CO)CH_2(CO)C_{12}H_{10}$, $C_4H_9-CH=CH-CH_2-(CO)CH_2-(CO)C_{12}H_{10}$ and the like;

β-keto acid compounds such as $CH_3(CO)CH_2(CO)OCH_3$, $CH_3(CO)CH_2(CO)OC_3H_7$, $CH_3(CO)CH_2(CO)O(iso-C_3H_7)$, $CH_3(CO)CH_2(CO)OC_4H_9$, $CH_3(CO)CH_2(CO)O(t-C_4H_9)$, $CH_3(CO)CH_2(CO)OC_6H_{13}$, $CH_3(CO)CH_2(CO)O(cyclo-C_6H_{12})$, $CH_3(CO)CH_2(CO)OC_{10}H_{21}$, $C_2H_5(CO)CH_2(CO)OC_2H_5$, $C_2H_5(CO)CH_2(CO)OC_4H_9$, $C_2H_5(CO)CH_2(CO)O(t-C_4H_9)$, $C_2H_5(CO)CH_2(CO)OC_{10}H_{21}$, $C_2H_5(CO)CH_2(CO)C_{12}H_{25}$, $C_2H_5(CO)CH_2(CO)(cyclo-C_6H_{12})$, $C_4H_9(CO)CH_2(CO)OC_3H_7$, $C_4H_9(CO)CH_2(CO)OC_4H_9$, $C_4H_9(CO)CH_2(CO)OC_{10}H_{21}$, $C_6H_{13}(CO)CH_2(CO)OCH_3$, $C_6H_{13}(CO)CH_2(CO)OC_3H_7$, $C_6H_{13}(CO)CH_2(CO)O(iso-C_3H_7)$, $C_6H_{13}(CO)CH_2(CO)OC_6H_{13}$, $C_6H_{13}(CO)CH_2(CO)O(cyclo-C_6H_{12})$, $C_6H_{13}(CO)CH_2(CO)OC_{10}H_{21}$, (Cyclo-$C_6H_{12})(CO)CH_2(CO)(cyclo-C_6H_{12})$, $CH_3(CO)CH_2(CO)-O-CH_2-CH=CH_2$, $CH_3(CO)CH_2(CO)O-(CH_2)_2CH=CH_2$, $CH_3(CO)CH_2(CO)O(CH_2)_4CH=CH_2$, $CH_3(CO)CH_2(CO)O-CH_2C(CH_3)=CH_2$, $CH_3(CO)CH_2(CO)-O-CH=CH-CH_3$, $C_2H_5(CO)CH_2(CO)OCH_2-CH=CH_2$, $C_2H_5(CO)CH_2(CO)OC(CH_3)=CH_2$, $C_2H_5(CO)CH_2(CO)OCH_2-CH=CH_2$, $C_4H_9(CO)CH_2(CO)OCH_2-CH=CH_2$, $C_4H_9(CO)CH_2(CO)OC(CH_3)=CH_2$, $C_6H_{13}(CO)CH_2(CO)-OCH_2-CH=CH_2$, (cyclo-$C_6H_{12})(CO)CH_2(CO)OCH_2-CH=CH_2$, $C_{10}H_{21}(CO)CH_2(CO)OCH_2-CH=CH_2$, $C_{10}H_{21}(CO)CH_2(CO)OC(CH_3)=CH_2$, $CH_3(CO)CH_2(CO)OC_6H_5$, $C_2H_5(CO)CH_2(CO)OC_6H_5$, $(iso-C_3H_7)(CO)CH_2(CO)OC_6H_5$, $(tert-C_4H_9)(CO)CH_2(CO)OC_6H_5$, (Cyclo-$C_6H_{12})(CO)CH_2(CO)OC_6H_5$, $C_6H_{13}(CO)CH_2(CO)OC_6H_5$, $C_{10}H_{21}(CO)CH_2(CO)OC_6H_5$, $CH_3(CO)CH_2(CO)OC_{12}H_{10}$, $C_3H_7(CO)CH_2(CO)OC_{12}H_{10}$, $C_4H_9(CO)CH_2(CO)OC_{12}H_{10}$, $C_{10}H_{21}(CO)CH_2(CO)OC_{12}H_{10}$, $C_{12}H_{25}(CO)CH_2(CO)C_{12}H_{10}$ and the like; and Malonic diester compounds such as $CH_3O(CO)CH_2(CO)OCH_3$, $CH_3O(CO)CH_2(CO)OC_2H_5$, $CH_3O(CO)CH_2(CO)O(i-C_3H_7)$, $CH_3O(CO)CH_2(CO)O(t-C_4H_9)$, $CH_3O(CO)CH_2(CO)OC_6H_{13}$, $CH_3O(CO)CH_2(CO)O(cyclo-C_6H_{12})$, $CH_3O(CO)CH_2(CO)OC_{10}H_{21}$, $C_2H_5O(CO)CH_2(CO)OC_3H_7$, $C_2H_5O(CO)CH_2(CO)O(t-C_4H_9)$, $C_2H_5O(CO)CH_2(CO)OC_6H_5$, $C_2H_5O(CO)CH_2(CO)O(cyclo-C_6H_{12})$, $C_2H_5O(C))CH_2(CO)OC_{10}H_{21}$, $C_6H_{13}O(CO)CH_2(CO)OC_5H_7$, $C_6H_{13}((CO)CH_2(CO)OC_4H_9$, $C_6H_{13}O(CO)CH_2(CO)OC_6H_{13}$, $C_6H_{13}O(CO)CH_2(CO)O(cyclo-C_6H_{12})$, $C_6H_{13}O(CO)CH_2(CO)OC_{10}H_{21}$, $C_{10}H_{21}O(CO)CH_2(CO)OC_{10}H_{21}$, $CH_3O(CO)CH_2(CO)OCH_2-CH=CH_2$, $CH_3O(CO)CH_2(CO)O(CH_2)_2-CH=CH_2$, $CH_3O(CO)CH_2(CO)OC(CH_3)=CH_2$, $CH_3O(CO)CH_2(CO)O-CH=CH-CH_3$, $C_4H_9O(CO)CH_2(CO)OCH_2-CH=CH_2$, $C_4H_9O(CO)CH_2(CO)O(CH_2)_2-CH=CH_2$, $C_4H_9O(CO)CH_2(CO)OC(CH_3)=CH_2$, $C_4H_9O(CO)CH_2(CO)OCH=CH-CH_3$, $C_6H_{13}O(CO)CH_2

(CO)OCH$_2$-CH=CH$_2$, C$_6$H$_{13}$O(CO)CH$_2$-(CO)O(CH$_2$)$_2$-CH=CH$_2$, C$_6$H$_{13}$O(CO)CH$_2$-(CO)OC(CH$_3$)=CH$_2$, C$_6$H$_{13}$O(CO)CH$_2$-(CO)OCH=CH-CH$_3$, (Cyclo-C$_6$H$_{12}$)O(CO)CH$_2$-(CO)O(CH$_2$)$_2$CH=CH$_2$, C$_{10}$H$_{21}$O(CO)CH$_2$-(CO)OCH$_2$-CH=CH$_2$, C$_{10}$H$_{21}$O(CO)CH$_2$-(CO)OC(CH$_3$)=CH$_2$, CH$_3$O(CO)CH$_2$(CO)OC$_6$H$_5$, C$_3$H$_7$O(CO)CH$_2$(CO)OC$_6$H$_5$, (iso-C$_3$H$_7$)O(CO)CH$_2$-(CO)OC$_6$H$_5$, (tert-C$_4$H$_9$)O(CO)CH$_2$(CO)OC$_6$H$_5$, C$_6$H$_{13}$O(CO)CH$_2$(CO)OC$_6$H$_5$, (cyclo-C$_6$H$_{12}$)O(CO)CH$_2$(CO)OC$_6$H$_5$, C$_{10}$H$_{21}$O(CO)CH$_2$(CO)OC$_6$H$_5$, CH$_3$O(CO)CH$_2$(CO)OC$_{12}$H$_{10}$, C$_3$H$_7$O(CO)CH$_2$-(CO)OC$_{12}$H$_{10}$, C$_{12}$H$_{25}$O(CO)CH$_2$(CO)OC$_{12}$H$_{10}$, CH$_2$=CH-CH$_2$-O(CO)CH$_2$(CO) OCH$_2$CH=CH$_2$, CH$_2$=CH-CH$_2$O(CO)CH$_2$(CO)OC(CH$_3$)=CH$_2$, CH$_2$=CH-CH$_2$O(CO)CH$_2$(CO)(CH$_2$)$_2$CH=CH$_2$, C$_4$H$_9$-(CO)CH$_2$(CO)OC$_{12}$H$_{10}$, (Cyclo-C$_6$H$_{12}$)O(CO)CH$_2$(CO)OC$_{12}$H$_{10}$, O(CO)CH$_2$-(CO)OCH$_2$CH=CH$_2$, CH$_2$=CH-CH$_2$O(CO)CH$_2$-(CO)OC(CH$_3$)=CH$_2$, CH$_2$=CH-CH$_2$-O(CO)CH$_2$-(CO)O(CH$_2$)$_2$CH=CH$_2$, CH$_2$=CH-CH$_2$-O(CO)CH$_2$-(CO)OC$_6$H$_5$, C$_4$H$_9$-CH=CH-CH$_2$-O(CO)CH$_2$-(CO)OCH$_2$CH=CH-C$_4$H$_9$, C$_6$H$_5$O(CO)CH$_2$-(CO)OC$_6$H$_5$, C$_6$H$_5$O(CO)CH$_2$(CO)OC$_{12}$H$_{10}$, C$_6$H$_5$O(CO)CH$_2$(CO)OCH$_2$-CH=CH$_2$ and the like.

These compounds may be used as a mixture of two or more members.

Among these compounds, β-diketone compounds and β-keto acids are preferable, and β-diketone compounds are particularly preferable. This invention by no means limited by the compounds mentioned above.

Next, as concrete examples of said compound (c), the following can be referred to. First, concrete examples of the compound of general formula (I), the following aliphatic α-hydroxyaldehydes and aliphatic ketoalcohols can be referred to.

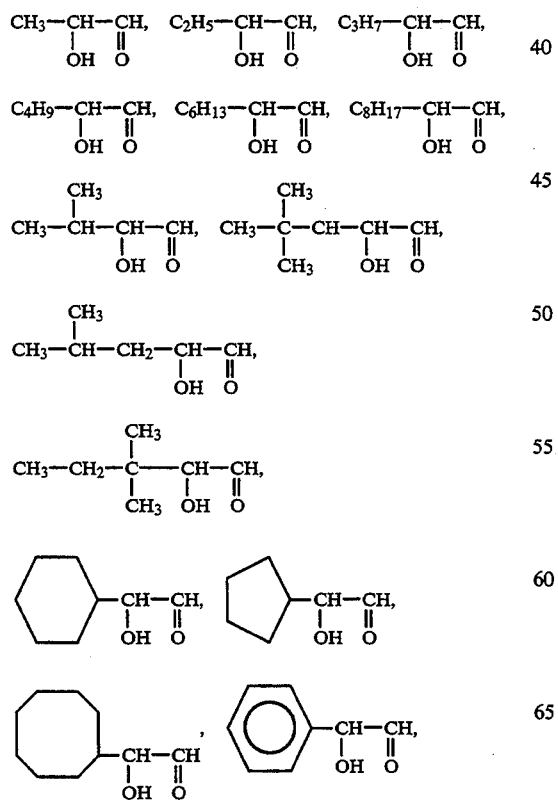

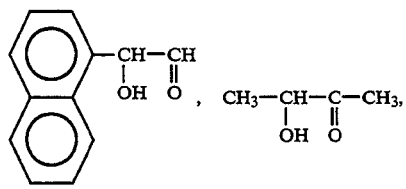

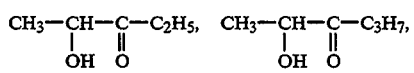

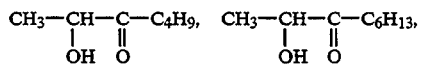

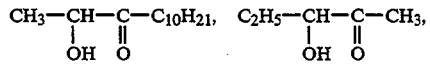

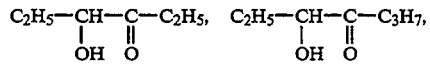

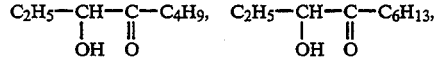

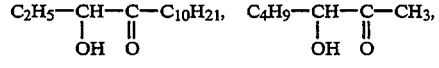

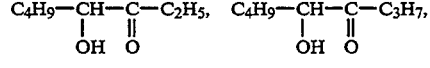

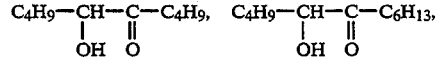

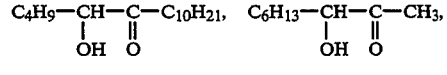

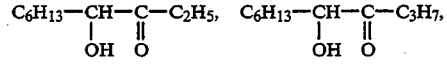

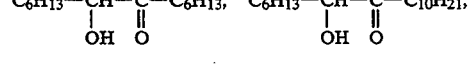

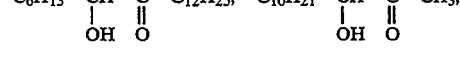

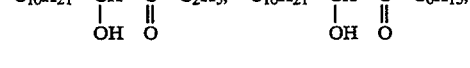

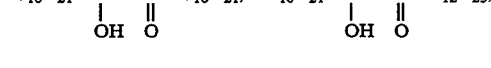

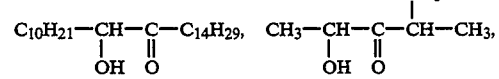

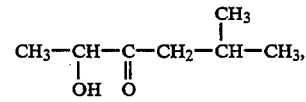

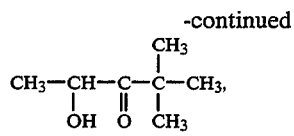
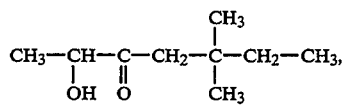
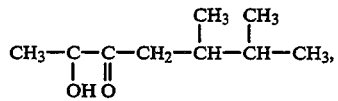
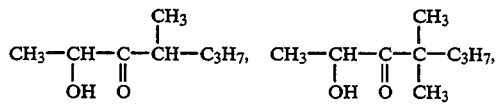
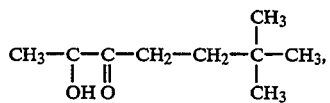
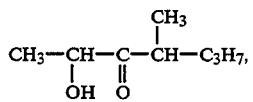
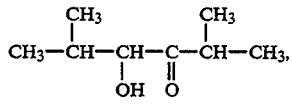
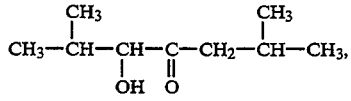
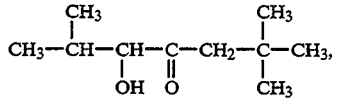
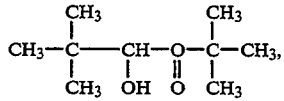
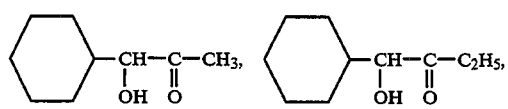
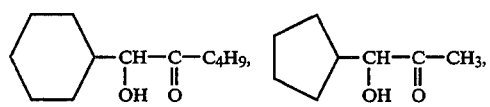
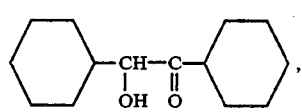
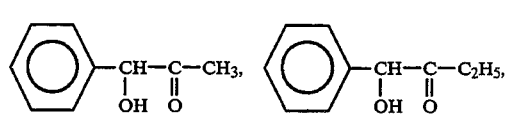
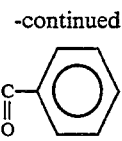
As concrete examples of the compound of general formula (II), the following aliphatic hydroxyaldehydes and aliphatic ketoalcohols can be referred to.
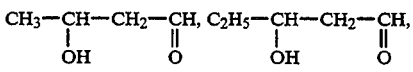
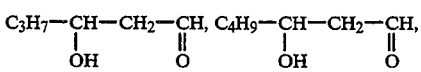
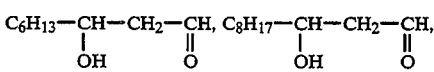
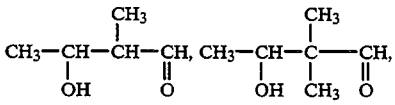
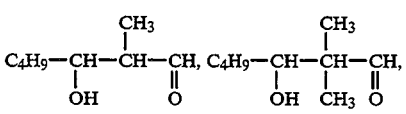
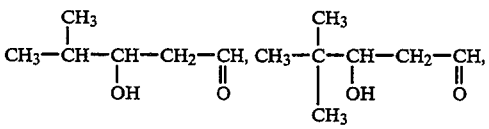
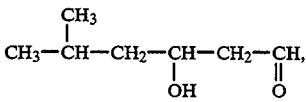
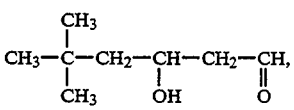
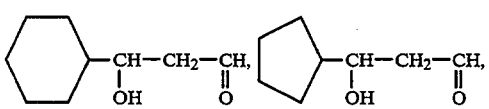
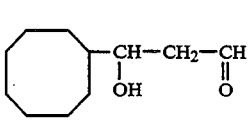
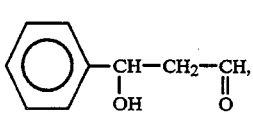
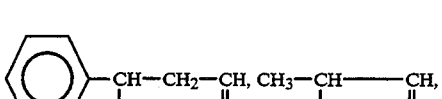

$$\text{C}_4\text{H}_9-\underset{\text{CH}_2\text{OH}}{\text{CH}}-\underset{\text{O}}{\overset{}{\text{CH}}}, \quad \text{C}_8\text{H}_{17}-\underset{\text{CH}_2\text{OH}}{\text{CH}}-\underset{\text{O}}{\overset{}{\text{CH}}},$$

$$\text{C}_{10}\text{H}_{21}-\underset{\text{CH}_2\text{OH}}{\text{CH}}-\underset{\text{O}}{\overset{}{\text{CH}}}, \quad \text{CH}_3-\underset{\text{CH}_2\text{OH}}{\overset{\text{CH}_3}{\text{C}}}-\underset{\text{O}}{\overset{}{\text{CH}}},$$

$$\text{Cyclohexyl}-\underset{\text{CH}_2\text{OH}}{\text{CH}}-\underset{\text{O}}{\overset{}{\text{CH}}}, \quad \text{Phenyl}-\underset{\text{CH}_2\text{OH}}{\text{CH}}-\underset{\text{O}}{\overset{}{\text{CH}}},$$

$$\text{Naphthyl}-\underset{\text{CH}_2\text{OH}}{\text{CH}}-\underset{\text{O}}{\overset{}{\text{CH}}}, \quad \text{CH}_3-\underset{\text{OH}}{\text{CH}}-\text{CH}_2-\underset{\text{O}}{\overset{}{\text{CH}}},$$

$$\text{C}_2\text{H}_5-\underset{\text{OH}}{\text{CH}}-\text{CH}_2-\text{CH}_2-\underset{\text{O}}{\overset{}{\text{CH}}},$$

$$\text{C}_3\text{H}_7-\underset{\text{OH}}{\text{CH}}-\text{CH}_2-\text{CH}_2-\underset{\text{O}}{\overset{}{\text{CH}}},$$

$$\text{C}_4\text{H}_9-\underset{\text{OH}}{\text{C}}-\text{CH}_2-\text{CH}_2-\underset{\text{O}}{\overset{}{\text{CH}}},$$

$$\text{C}_6\text{H}_{13}-\underset{\text{OH}}{\text{CH}}-\text{CH}_2-\text{CH}_2-\underset{\text{O}}{\overset{}{\text{CH}}},$$

$$\text{C}_8\text{H}_{17}-\underset{\text{OH}}{\text{CH}}-\text{CH}_2-\text{CH}_2-\underset{\text{O}}{\overset{}{\text{CH}}},$$

$$\text{CH}_3-\underset{\text{OH}}{\text{CH}}-\overset{\text{CH}_3}{\underset{}{\text{CH}}}-\text{CH}_2-\underset{\text{O}}{\overset{}{\text{CH}}}, \quad \text{CH}_3-\underset{\text{OH}}{\text{CH}}-\text{CH}_2-\overset{\text{CH}_3}{\underset{}{\text{CH}}}-\underset{\text{O}}{\overset{}{\text{CH}}},$$

$$\text{CH}_3-\underset{\text{OH}}{\text{CH}}-\overset{\text{CH}_3}{\underset{\text{CH}_3}{\text{C}}}-\text{CH}_2-\underset{\text{O}}{\overset{}{\text{CH}}}, \quad \text{CH}_3-\underset{\text{OH}}{\text{CH}}-\text{CH}_2-\overset{\text{CH}_3}{\underset{\text{CH}_3}{\text{C}}}-\underset{\text{O}}{\overset{}{\text{CH}}},$$

$$\text{C}_4\text{H}_9-\underset{\text{OH}}{\text{CH}}-\overset{\text{CH}_3}{\underset{}{\text{CH}}}-\text{CH}_2-\underset{\text{O}}{\overset{}{\text{CH}}},$$

$$\text{C}_4\text{H}_9-\underset{\text{OH}}{\text{CH}}-\text{CH}_2-\overset{\text{CH}_3}{\underset{}{\text{CH}}}-\underset{\text{O}}{\overset{}{\text{CH}}}, \quad \text{C}_4\text{H}_9-\underset{\text{OH}}{\text{CH}}-\overset{\text{CH}_3}{\underset{\text{CH}_3}{\text{C}}}-\text{CH}_2-\underset{\text{O}}{\overset{}{\text{CH}}},$$

$$\text{C}_4\text{H}_9-\underset{\text{OH}}{\text{CH}}-\text{CH}_2-\overset{\text{CH}_3}{\underset{\text{CH}_3}{\text{C}}}-\underset{\text{O}}{\overset{}{\text{CH}}}, \quad \text{CH}_3-\underset{\text{OH}}{\text{CH}}-\text{CH}=\text{CH}-\underset{\text{O}}{\overset{}{\text{CH}}},$$

$$\text{C}_2\text{H}_5-\underset{\text{OH}}{\text{CH}}-\text{CH}=\text{CH}-\underset{\text{O}}{\overset{}{\text{CH}}}, \quad \text{C}_3\text{H}_7-\underset{\text{OH}}{\text{CH}}-\text{CH}=\text{CH}-\underset{\text{O}}{\overset{}{\text{CH}}},$$

$$\text{C}_4\text{H}_9-\underset{\text{OH}}{\text{CH}}-\text{CH}=\text{CH}-\underset{\text{O}}{\overset{}{\text{CH}}},$$

-continued $$\text{C}_6\text{H}_{13}-\underset{\text{OH}}{\text{CH}}-\text{CH}=\text{CH}-\underset{\text{O}}{\overset{}{\text{CH}}},$$

$$\text{C}_8\text{H}_{17}-\underset{\text{OH}}{\text{CH}}-\text{CH}=\text{CH}-\underset{\text{O}}{\overset{}{\text{CH}}}, \quad \text{CH}_3-\underset{\text{OH}}{\text{CH}}-\overset{\text{CH}_3}{\underset{}{\text{C}}}=\text{CH}-\underset{\text{O}}{\overset{}{\text{CH}}},$$

$$\text{CH}_3-\underset{\text{OH}}{\overset{\text{CH}_3}{\text{CH}}}-\overset{\text{CH}_3}{\underset{}{\text{C}}}=\text{CH}-\underset{\text{O}}{\overset{}{\text{CH}}}, \quad \text{C}_4\text{H}_9-\underset{\text{OH}}{\text{CH}}-\overset{\text{CH}_3}{\underset{}{\text{C}}}=\text{CH}-\underset{\text{O}}{\overset{}{\text{CH}}},$$

$$\text{C}_4\text{H}_9-\underset{\text{OH}}{\overset{\text{CH}_3}{\text{C}}}=\overset{\text{CH}_3}{\underset{}{\text{C}}}-\underset{\text{O}}{\overset{}{\text{CH}}},$$

$$\text{CH}_3-\underset{\text{OH}}{\overset{\text{CH}_3}{\text{CH}}}-\overset{\text{CH}_3}{\underset{}{\text{CH}}}=\text{CH}-\underset{\text{O}}{\overset{}{\text{CH}}},$$

$$\text{CH}_3-\underset{\text{CH}_3}{\overset{\text{CH}_3}{\text{C}}}-\underset{\text{OH}}{\overset{\text{CH}_3}{\text{CH}}}=\text{CH}-\underset{\text{O}}{\overset{}{\text{CH}}},$$

$$\text{Cyclohexyl}-\underset{\text{OH}}{\text{CH}}-\overset{\text{CH}_3}{\underset{}{\text{C}}}=\text{CH}-\underset{\text{O}}{\overset{}{\text{CH}}},$$

$$\text{Cyclopentyl}-\underset{\text{OH}}{\text{CH}}-\overset{\text{CH}_3}{\underset{}{\text{C}}}=\text{CH}-\underset{\text{O}}{\overset{}{\text{CH}}},$$

$$\text{Phenyl}-\underset{\text{OH}}{\text{CH}}-\overset{\text{CH}_3}{\underset{}{\text{C}}}=\text{CH}-\underset{\text{O}}{\overset{}{\text{CH}}},$$

$$\text{Naphthyl}-\underset{\text{OH}}{\text{CH}}-\overset{\text{CH}_3}{\underset{}{\text{C}}}=\text{CH}-\underset{\text{O}}{\overset{}{\text{CH}}}, \quad \text{CH}_3-\underset{\text{CH}_2\text{OH}}{\text{CH}}-\text{CH}_2-\underset{}{\overset{}{\text{CH}}},$$

$$\text{C}_4\text{H}_9-\underset{\text{CH}_2\text{OH}}{\text{CH}}-\text{CH}_2-\underset{\text{O}}{\overset{}{\text{CH}}}, \quad \text{C}_8\text{H}_{17}-\underset{\text{CH}_2\text{OH}}{\text{CH}}-\text{CH}_2-\underset{\text{O}}{\overset{}{\text{CH}}},$$

$$\text{C}_{10}\text{H}_{21}-\underset{\text{CH}_2\text{OH}}{\text{CH}}-\text{CH}_2-\underset{\text{O}}{\overset{}{\text{CH}}}, \quad \text{CH}_3-\underset{\text{CH}_2\text{OH}}{\overset{\text{CH}_3}{\text{CH}}}-\underset{\text{O}}{\overset{}{\text{CH}}},$$

$$\text{CH}_3-\underset{\text{HOH}_2\text{C}}{\overset{\text{CH}_3}{\text{C}}}-\underset{\text{CH}_3}{\overset{}{\text{CH}}}-\underset{\text{O}}{\overset{}{\text{CH}}}, \quad \text{C}_4\text{H}_9-\underset{\text{HOH}_2\text{C}}{\overset{\text{CH}_3}{\text{CH}}}-\underset{\text{O}}{\overset{}{\text{CH}}},$$

$$\text{C}_4\text{H}_9-\underset{\text{HOH}_2\text{C}}{\overset{\text{CH}_3}{\text{C}}}-\underset{\text{CH}_3}{\overset{}{\text{CH}}}, \quad \text{CH}_3-\underset{\text{OH}}{\text{CH}}-\text{CH}_2-\overset{\text{CH}_3}{\underset{\text{O}}{\text{C}}}-\text{CH}_3,$$

-continued $C_4H_9-CH(OH)-CH_2-C(O)-C_4H_9$, $C_{10}H_{21}-CH(OH)-CH_2-C(O)-C_{10}H_{21}$, $CH_3-CH(OH)-CH_2-C(O)-C_4H_9$, $C_4H_9-CH(OH)-CH_2-C(O)-C_{10}H_{21}$, $C_{10}H_{21}-CH(OH)-CH_2-C(O)-C_{14}H_{29}$, $CH_3-CH(OH)-CH(CH_3)-C(O)-CH_3$, $C_4H_9-CH(OH)-CH(CH_3)-C(O)-C_4H_9$, $C_{10}H_{21}-CH(OH)-CH(CH_3)-C(O)-C_{10}H_{21}$, $CH_3-CH(OH)-CH(CH_3)-C(O)-C_4H_9$, $C_4H_9-CH(OH)-CH(CH_3)-C(O)-C_{10}H_{21}$, $C_{10}H_{21}-CH(OH)-CH(CH_3)-C(O)-C_{14}H_{29}$, $CH_3-CH(OH)-C(CH_3)_2-C(O)-CH_3$, $C_4H_9-CH(OH)-C(CH_3)_2-C(O)-C_4H_9$, $C_{10}H_{21}-CH(OH)-C(CH_3)_2-C(O)-C_{10}H_{21}$, $CH_3-CH(OH)-C(CH_3)_2-C(O)-C_4H_9$, $C_4H_9-CH(OH)-C(CH_3)_2-C(O)-C_{10}H_{29}$, $C_{10}H_{21}-CH(OH)-C(CH_3)_2-C(O)-C_{14}H_{29}$, $CH_3-CH(OH)-CH_2-C(O)-CH(CH_3)-CH_3$, $CH_3-CH(OH)-CH_2-C(O)-CH(CH_3)-CH_3$, $CH_3-CH(OH)-CH_2-C(O)-C(CH_3)(C_2H_5)-CH_3$, $CH_3-CH(OH)-CH_2-C(O)-CH_2-CH(CH_3)-CH_3$, $CH_3-CH(OH)-CH(CH_3)-C(O)-CH(CH_3)-CH_3$, $CH_3-CH(OH)-CH(CH_3)-C(O)-CH_2-C(CH_3)(C_2H_5)$, $CH_3-C(OH)(CH_3)-C(O)-CH_2-CH(CH_3)-CH_3$, $CH_3-CH(OH)-C(CH_3)_2-C(O)-CH(CH_3)-CH_3$, $CH_3-C(OH)(CH_3)-C(CH_3)_2-C(O)-C(CH_3)_3$, $CH_3-CH(OH)-C(CH_3)_2-C(O)-CH_2-CH(CH_3)-CH_3$, $CH_3-CH(CH_3)-CH(OH)-CH_2-C(O)-CH(CH_3)-CH_3$, $CH_2=CH-CH(OH)-CH_2-C(O)-CH_2-CH(CH_3)-CH_3$, $CH_3-CH(OH)-CH_2-C(O)-CH_2-C(CH_3)_2-CH_3$, $(CH_3)_2C(CH_3)-CH(OH)-CH_2-C(O)-C(CH_3)_2-CH_3$, $CH_3-CH(CH_3)-CH(OH)-CH(CH_3)-C(O)-CH(CH_3)-CH_3$,

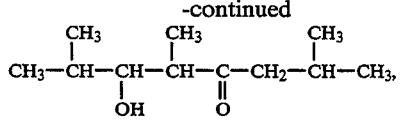
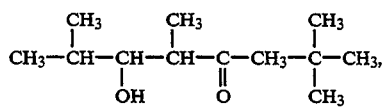
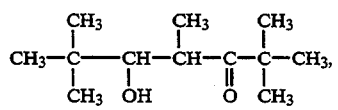
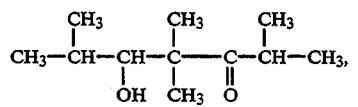
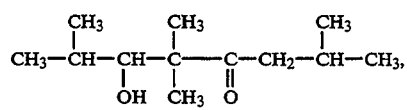
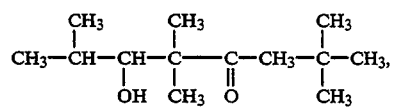
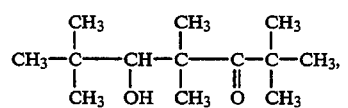
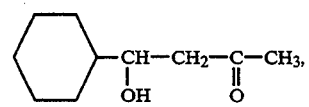
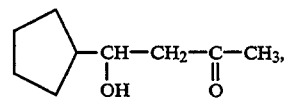
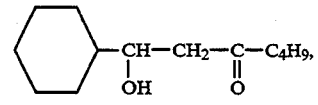
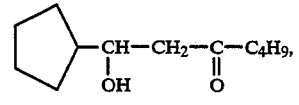
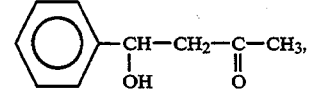
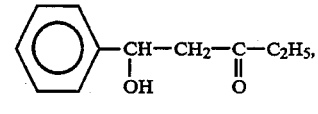
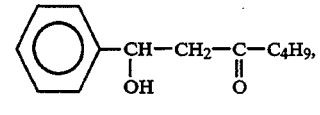
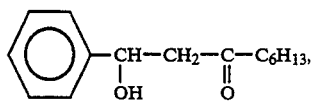
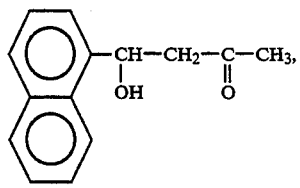
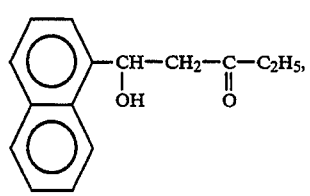
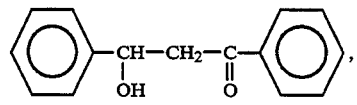
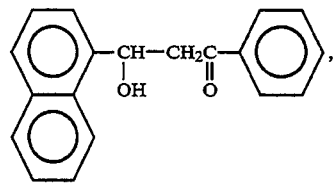
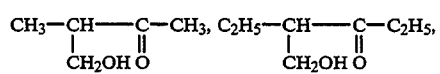
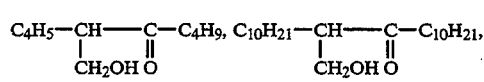
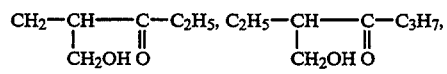
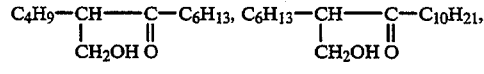
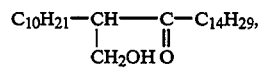
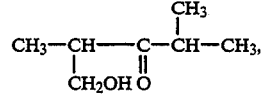
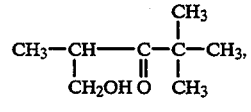
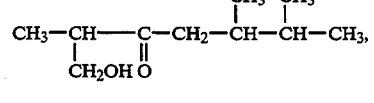

-continued
CH₃—CH—C—CH—CH₂—CH—CH₃,
    |    ||  |
  CH₂OH O  CH₃       CH₃
CH₃—CH—CH—C—CH—CH₃,
  |   |  ||  |
 CH₃ HOH₂C O  CH₃
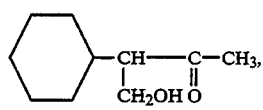
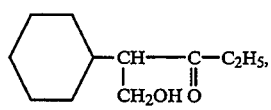
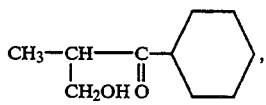
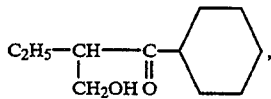
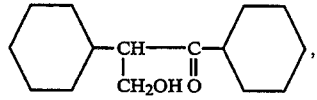
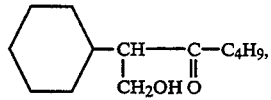
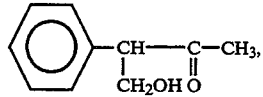
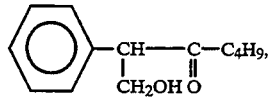
-continued
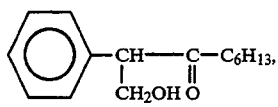
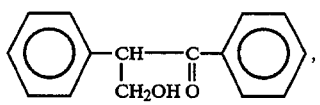
CH₃CH—CH₂—CH₂—C—CH₃,
   |          ||
  OH           O
C₂H₅—CH—CH₂—CH₂—C—C₂H₅,
    |           ||
   OH          O
C₄H₉—CH—CH₂—CH₂—C—C₄H₉,
    |           ||
   OH          O
CH₃—CH—CH₂—CH₂—C—C₂H₅,
   |           ||
  OH          O
C₂H₅—CH—CH₂—CH₂—C—C₄H₉,
    |          ||
   OH         O
C₄H₉—CH—CH₂—CH₂—C—C₂H₅,
    |          ||
   OH         O
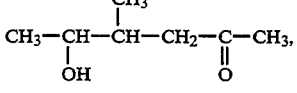
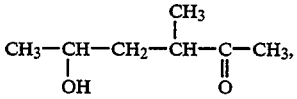
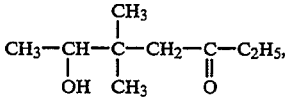
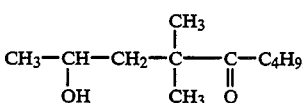
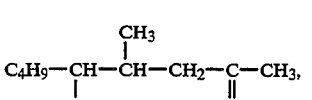
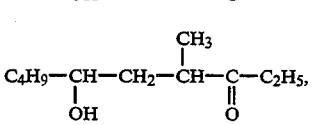
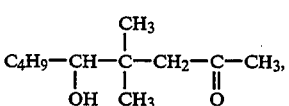
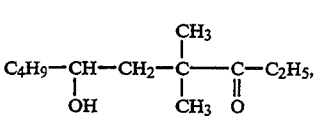

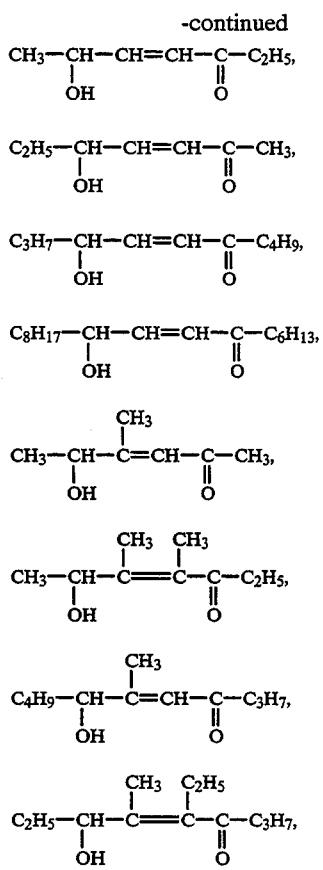
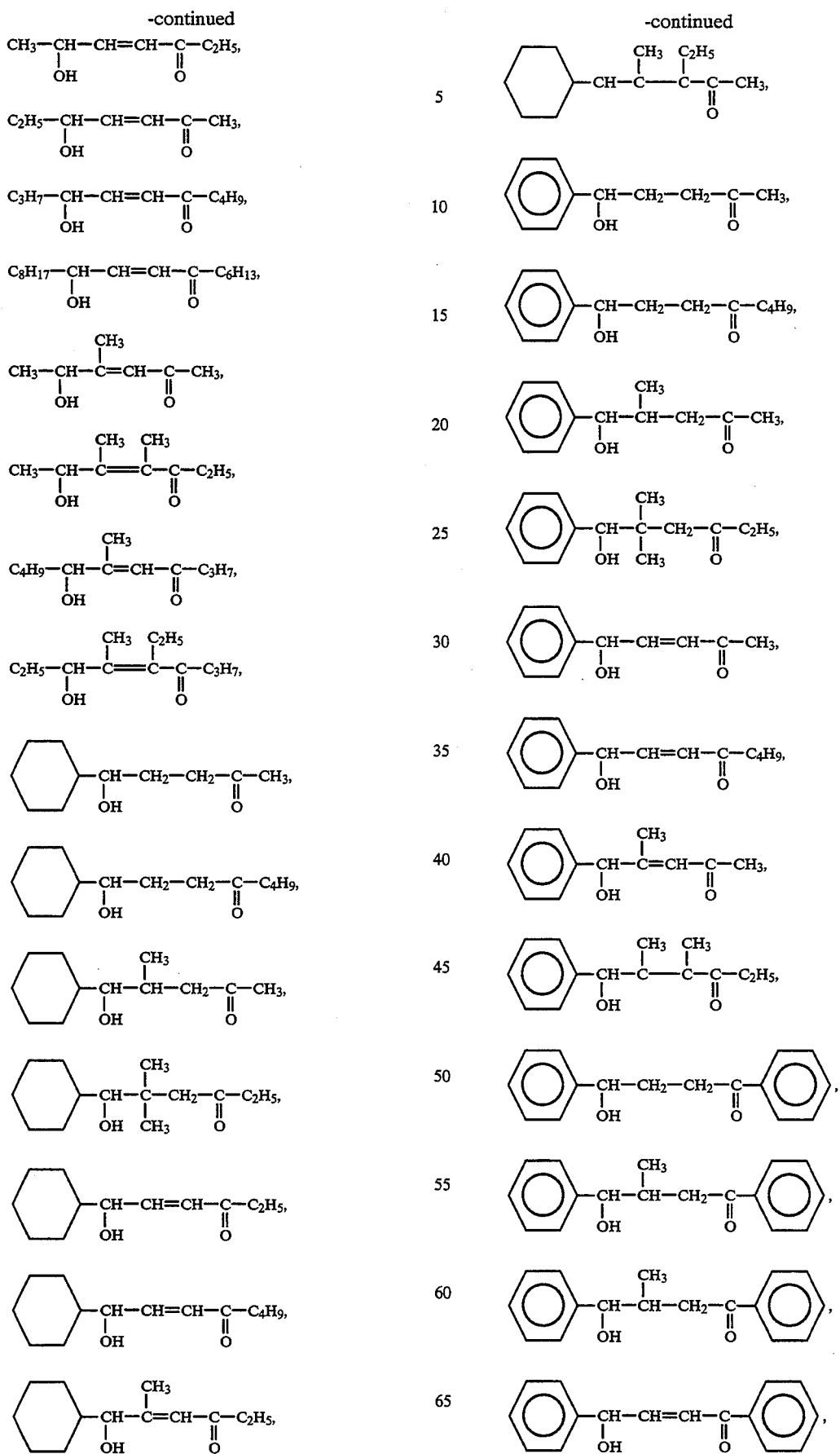

-continued $$\underset{OH}{\underset{|}{C_6H_5-CH}}-CH=\underset{\underset{CH_3}{|}}{C}-\underset{\underset{O}{||}}{C}-C_6H_5,$$

$$CH_3-\underset{\underset{CH_2OH}{|}}{CH}-CH_2-\underset{\underset{O}{||}}{C}-CH_3,$$

$$C_2H_5-\underset{\underset{CH_2OH}{|}}{CH}-\underset{\underset{CH_3}{|}}{\overset{CH_3}{\underset{|}{C}}}-\underset{\underset{O}{||}}{C}-C_2H_5,$$

$$C_2H_5-\underset{\underset{CH_2OH}{|}}{CH}-\underset{\underset{}{|}}{\overset{CH_3}{\underset{|}{CH}}}-\underset{\underset{O}{||}}{C}-C_2H_5,$$

$$C_4H_9-\underset{\underset{CH_2OH}{|}}{CH}-CH_2-\underset{\underset{O}{||}}{C}-C_4H_9,$$

$$C_{10}H_{21}-\underset{\underset{CH_2OH}{|}}{CH}-\underset{\underset{}{|}}{\overset{CH_3}{\underset{|}{CH}}}-\underset{\underset{O}{||}}{C}-C_{10}H_{21},$$

$$C_{10}H_{21}-\underset{\underset{CH_2OH}{|}}{CH}-\underset{\underset{CH_3}{|}}{\overset{CH_3}{\underset{|}{C}}}-\underset{\underset{O}{||}}{C}-C_{10}H_{21},$$

$$CH_3-\underset{\underset{CH_2OH}{|}}{CH}-\underset{\underset{}{|}}{\overset{CH_3}{\underset{|}{CH}}}-\underset{\underset{O}{||}}{C}-C_4H_9,$$

$$C_4H_9-\underset{\underset{CH_2OH}{|}}{CH}-\underset{\underset{}{|}}{\overset{CH_3}{\underset{|}{CH}}}-\underset{\underset{O}{||}}{C}-C_{10}H_{21},$$

$$C_{10}H_{21}-\underset{\underset{CH_2OH}{|}}{CH}-\underset{\underset{}{|}}{\overset{CH_3}{\underset{|}{CH}}}-\underset{\underset{O}{||}}{C}-C_{14}H_{29},$$

$$CH_3-\underset{\underset{CH_2OH}{|}}{CH}-\underset{\underset{CH_3}{|}}{\overset{CH_3}{\underset{|}{C}}}-\underset{\underset{O}{||}}{C}-C_4H_9,$$

$$C_4H_9-\underset{\underset{CH_2OH}{|}}{CH}-\underset{\underset{CH_3}{|}}{\overset{CH_3}{\underset{|}{C}}}-\underset{\underset{O}{||}}{C}-C_{10}H_{21},$$

$$C_{10}H_{21}-\underset{\underset{CH_2OH}{|}}{CH}-\underset{\underset{CH_3}{|}}{\overset{CH_3}{\underset{|}{C}}}-\underset{\underset{O}{||}}{C}-C_{14}H_{29},$$

$$CH_3-\underset{\underset{CH_2OH}{|}}{CH}-CH_2-\underset{\underset{O}{||}}{C}-C_4H_9,$$

$$C_4H_9-\underset{\underset{CH_2OH}{|}}{CH}-CH_2-\underset{\underset{O}{||}}{C}-C_{12}H_{25},$$

$$C_{10}H_{21}-\underset{\underset{CH_2OH}{|}}{CH}-CH_2-\underset{\underset{O}{||}}{C}-C_{14}H_{29},$$

-continued $$CH_3-\underset{\underset{CH_2OH}{|}}{CH}-CH_2-\underset{\underset{O}{||}}{C}-\overset{CH_3}{\underset{|}{CH}}-CH_3,$$

$$CH_3-\underset{\underset{CH_2OH}{|}}{CH}-CH_2-\underset{\underset{O}{||}}{C}-\underset{\underset{CH_3}{|}}{\overset{CH_3}{\underset{|}{C}}}-CH_3,$$

$$CH_3-\underset{\underset{CH_2OH}{|}}{CH}-CH_2-\underset{\underset{O}{||}}{C}-CH_2-\overset{CH_3}{\underset{|}{CH}}-\overset{CH_3}{\underset{|}{CH}}-CH_3,$$

$$CH_3-\underset{\underset{CH_2OH}{|}}{CH}-CH_2-\underset{\underset{O}{||}}{C}-2-\overset{CH_3}{\underset{|}{CH}}-CH_2-\overset{CH_3}{\underset{|}{CH}}-CH_3,$$

$$CH_3-\underset{\underset{CH_2OH}{|}}{CH}-\overset{CH_3}{\underset{|}{CH}}-\underset{\underset{O}{||}}{C}-\overset{CH_3}{\underset{|}{CH}}-CH_3,$$

$$CH_3-\underset{\underset{CH_2OH}{|}}{CH}-\overset{CH_3}{\underset{|}{CH}}-\underset{\underset{O}{||}}{C}-\overset{CH_3}{\underset{|}{CH}}-CH_3,$$

$$CH_3-\underset{\underset{CH_2OH}{|}}{CH}-\overset{CH_3}{\underset{|}{OH}}-\underset{\underset{O}{||}}{C}-CH_2-\underset{\underset{CH_3}{|}}{\overset{CH_3}{\underset{|}{CH}}}-CH_3,$$

$$CH_3-\underset{\underset{CH_2OH}{|}}{CH}-\overset{CH_3}{\underset{|}{C}}-\underset{\underset{O}{||}}{C}-CH_2-\overset{CH_3}{\underset{|}{CH}}-CH_3,$$

$$CH_3-\underset{\underset{CH_2OH\ CH_3}{|}}{CH}-\underset{\underset{}{|}}{\overset{CH_3}{\underset{|}{C}}}-\underset{\underset{O}{||}}{C}-\overset{CH_3}{\underset{|}{CH}}-CH_3,$$

$$CH_3-\underset{\underset{HOH_2C}{|}}{CH}-\underset{\underset{CH_3}{|}}{\overset{CH_3}{\underset{|}{C}}}-\underset{\underset{O}{||}}{C}-\overset{CH_3}{\underset{|}{CH}}-CH_3,$$

$$CH_3-\underset{\underset{CH_2OH\ CH_3}{|}}{CH}-\underset{\underset{CH_3}{|}}{\overset{CH_3}{\underset{|}{C}}}-\underset{\underset{O}{||}}{C}-CH_2-\overset{CH_3}{\underset{|}{CH}}-CH_3,$$

$$CH_3-\underset{\underset{CH_2OH\ CH_3}{|}}{CH}-\underset{\underset{CH_3}{|}}{\overset{CH_3}{\underset{|}{C}}}-\underset{\underset{O}{||}}{C}-CH_2-CH_2-\overset{CH_3}{\underset{|}{CH}}-CH_3,$$

$$CH_3-\overset{CH_3}{\underset{|}{CH}}-CH-CH_2-\underset{\underset{O}{||}}{C}-\overset{CH_3}{\underset{|}{CH}}-CH_3,$$
$$\underset{CH_2OH}{}$$

$$CH_3-\overset{CH_3}{\underset{|}{CH}}-\underset{\underset{CH_2OH}{|}}{CH}-CH_2-\underset{\underset{O}{||}}{C}-CH_2-\overset{CH_3}{\underset{|}{CH}}-CH_3,$$

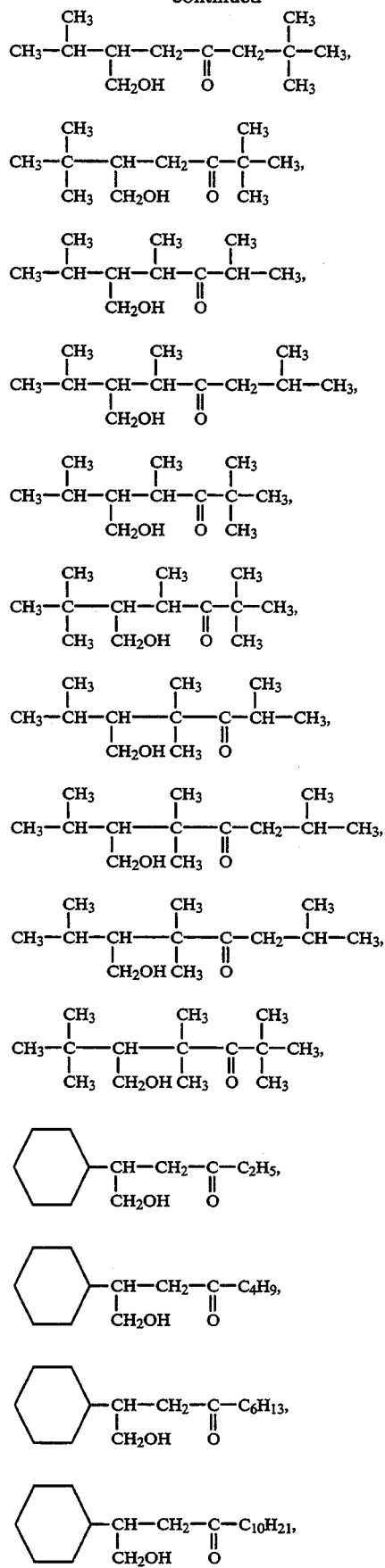
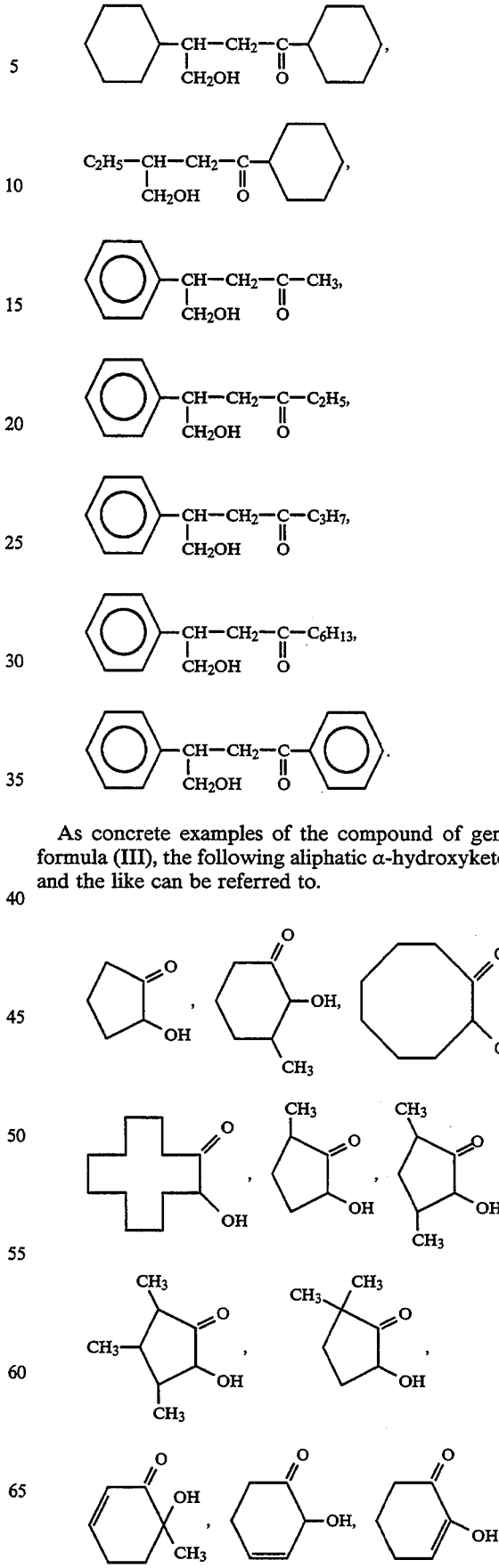
As concrete examples of the compound of general formula (III), the following aliphatic α-hydroxyketones and the like can be referred to.

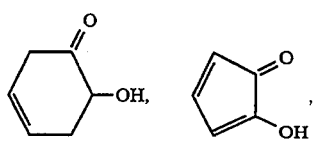
As concrete examples of the compound of general formula (IV), the following aliphatic hydroxyketones and the like can be referred to.
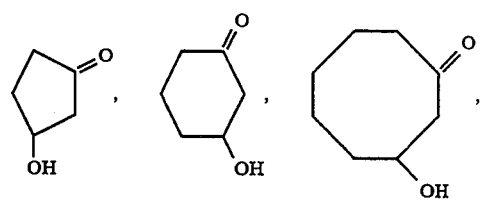
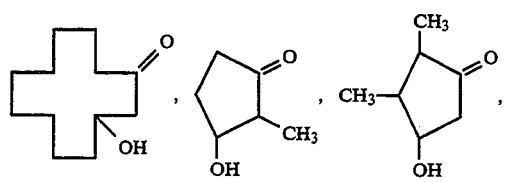
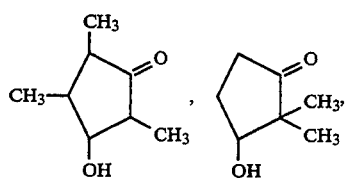
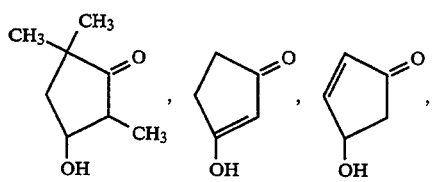
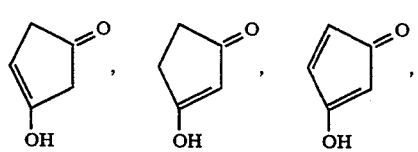
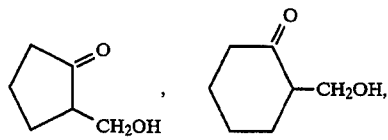
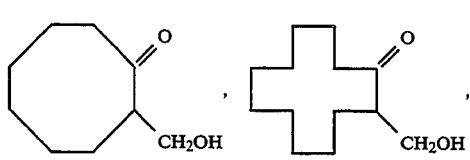
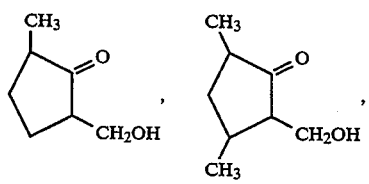
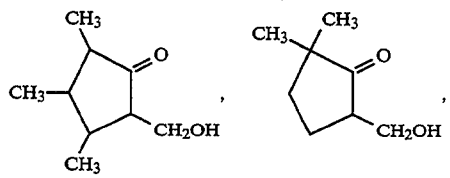
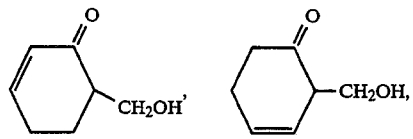
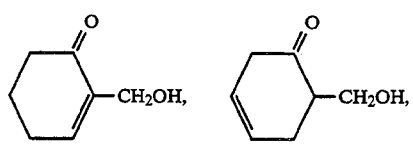
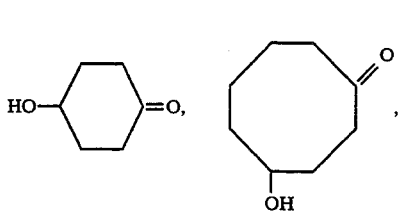
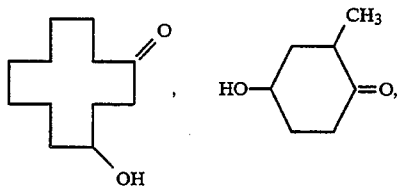
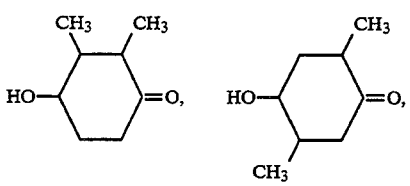
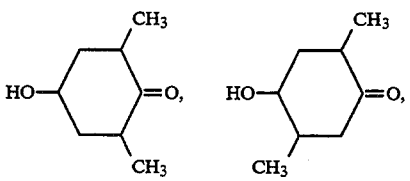
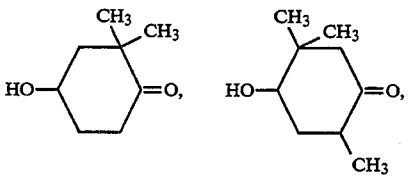
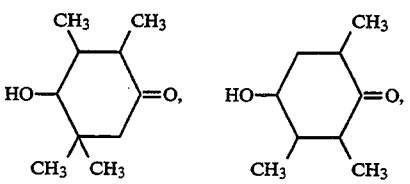

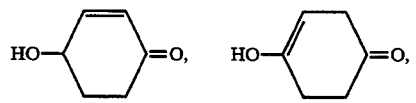
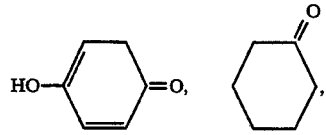
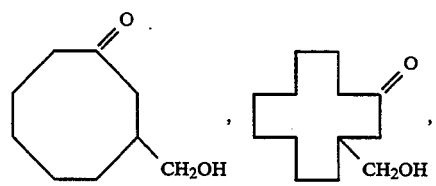
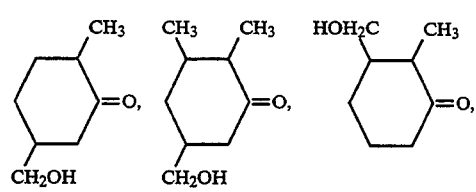
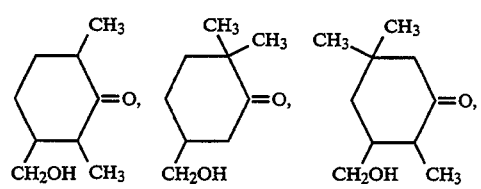
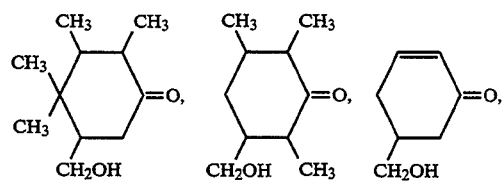
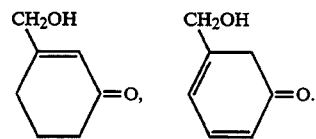
As concrete examples of the compound of general formula (V), the following aliphatic hydroxyaldehydes, aromatic hydroxyketones and the like can be referred to.
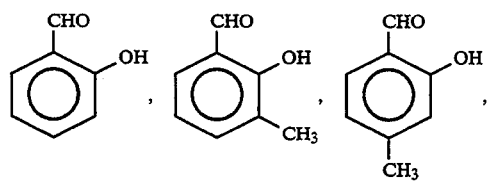
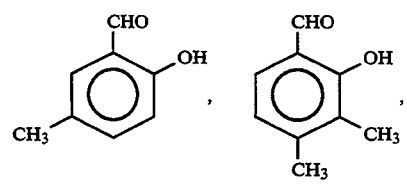
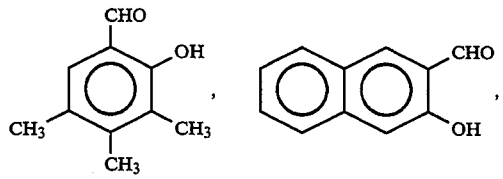
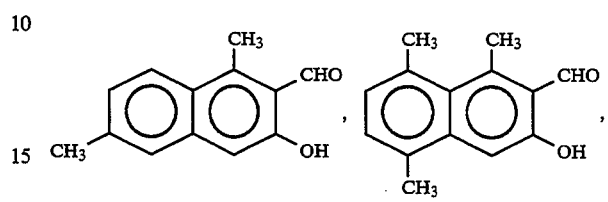
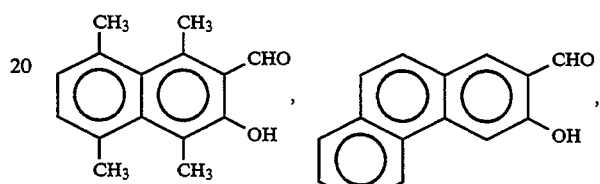
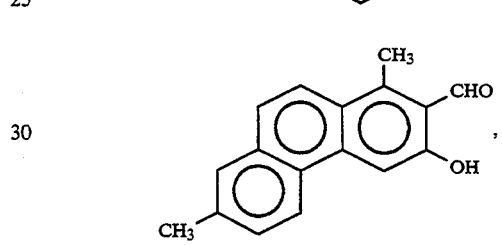
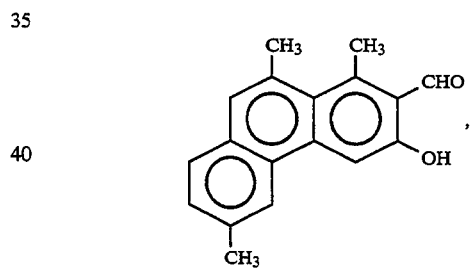
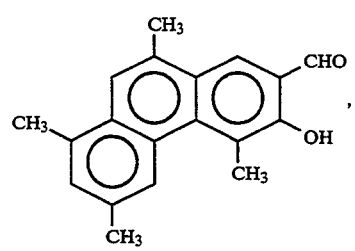
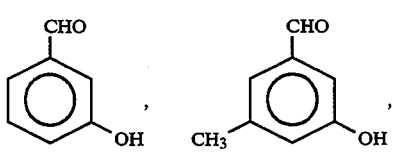
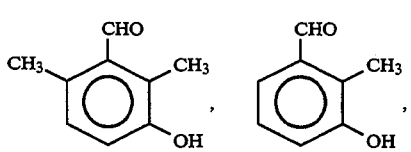

-continued
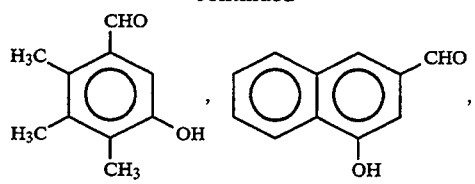, 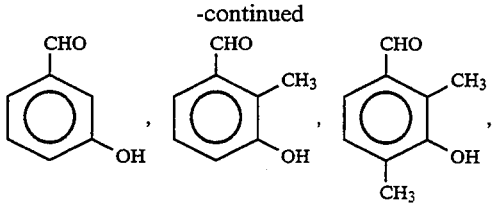
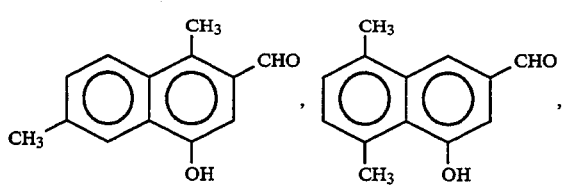, 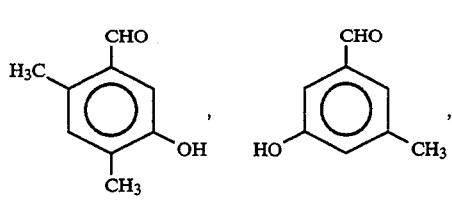
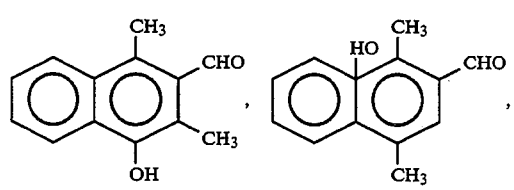, 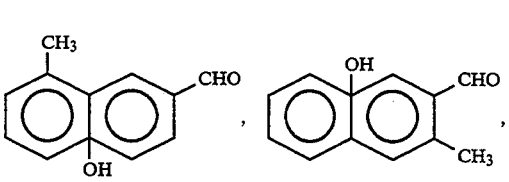
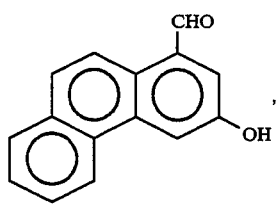,
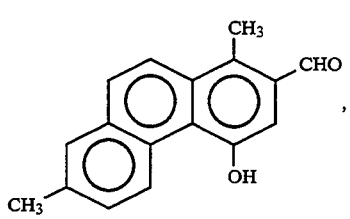,
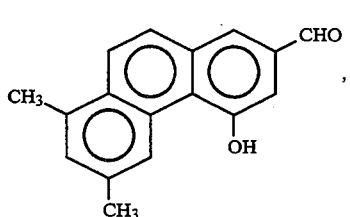,
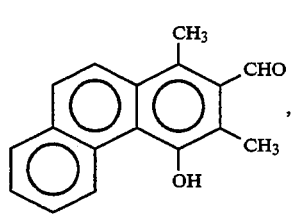,
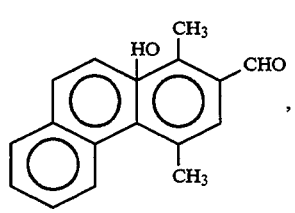
-continued
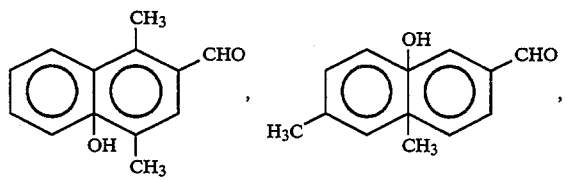
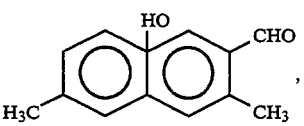
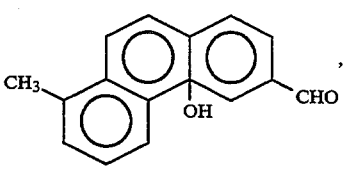
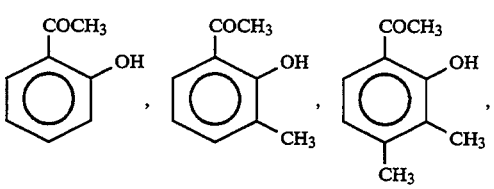
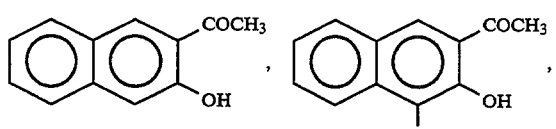
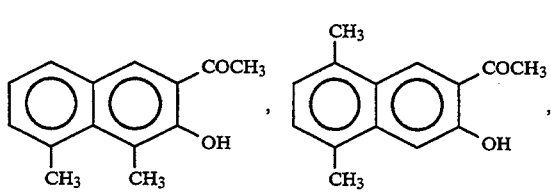

-continued
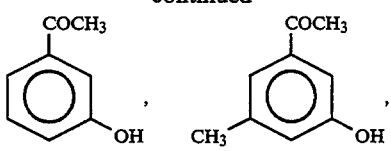
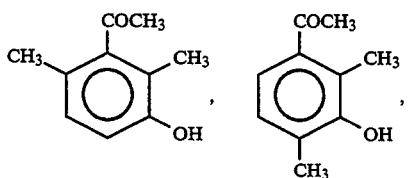
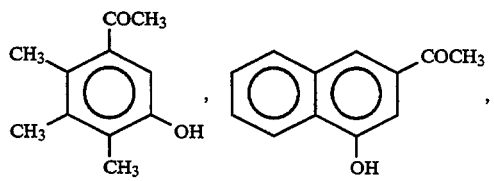
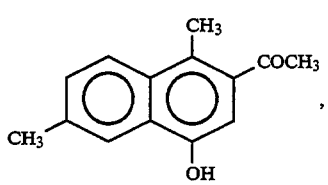
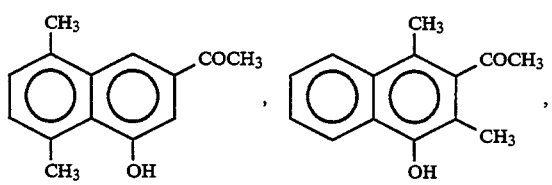
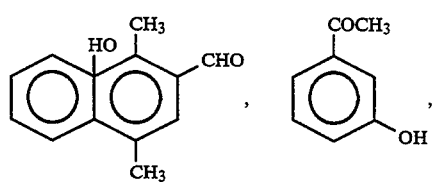
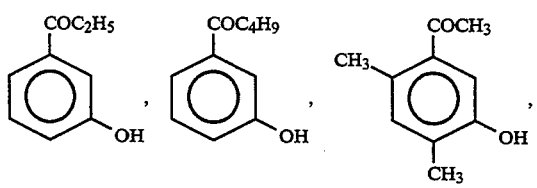
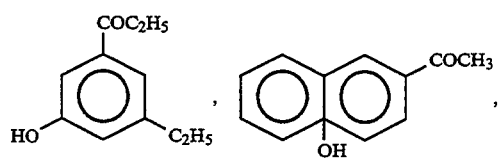
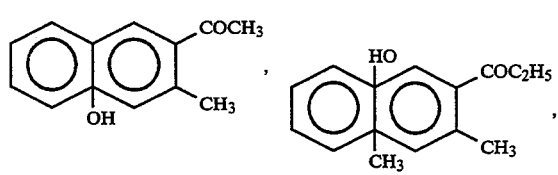
-continued
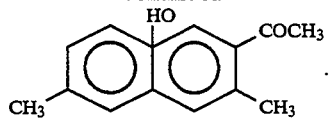
As concrete examples of the compound of general formula (VI), the following aromatic hydroxyaldehydes, aromatic hydroxyketones and the like can be referred to.
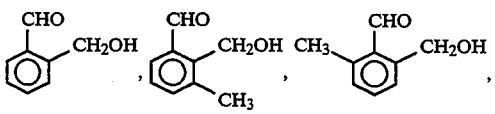
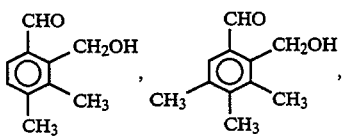
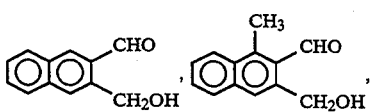
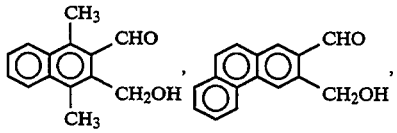
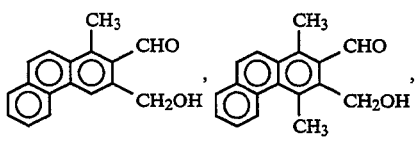
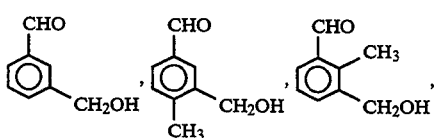
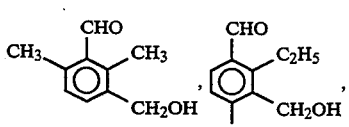
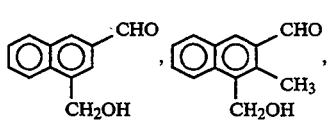
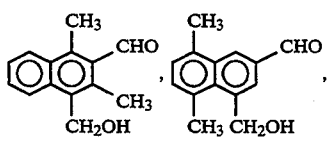
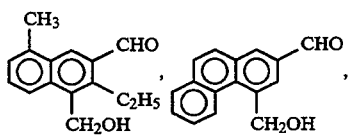

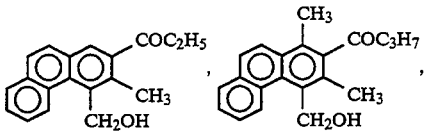
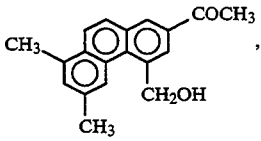
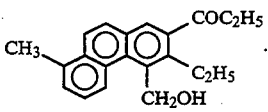
Among the above-mentioned compounds, hydroxyketone compounds represented by the following general formulas:
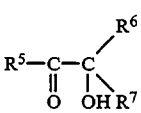 (I)
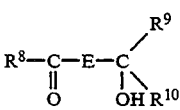 (II)
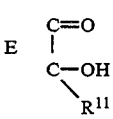 (III)
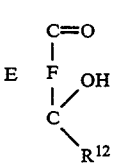 (IV)
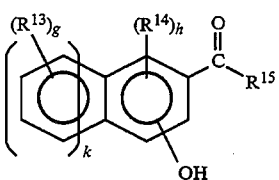 (V)
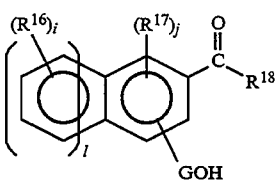 (VI)
wherein $R^5$ to $R^{18}$ each represents a hydrocarbon group having 1 to 30 carbon atoms are preferable, and aliphatic hydroxyketone compounds represented by general formulas:

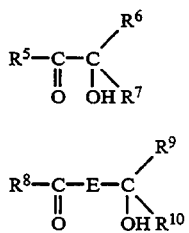

(I)

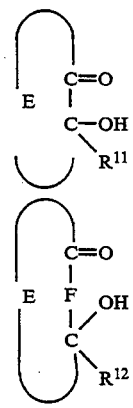

(II)

wherein $R^5$ to $R^{10}$ each represents aliphatic hydrocarbon group having 1 to 30 carbon atoms and/or hydrogen, and alicyclic hydroxyketone compounds represented by general formulas:

(III)

(IV)

wherein $R^{11}$ and 12 each represents aliphatic hydrocarbon group having 1 to 30 carbon atoms and/or hydrogen, and E and F each represents straight or branched aliphatic hydrocarbon chain having 1 to 30 carbon atoms, are particularly preferable.

As the organoaluminum compound used as catalyst component (B) of this invention, known organoaluminum compounds can be used.

As preferable examples of the organoaluminum compound, organoaluminum compounds represented by general formula $R^{22}{}_a\text{ALM}_{3-a}$ and acyclic or cyclic aluminoxanes having a structure represented by general formula $-\text{Al}(R^{23})-\text{O}]_b$ can be referred to.

In these formulas, $R^{22}$ and $R^{23}$ are the same or different from each other, and each represents a hydrocarbon group having 1 to 8 carbon atoms; M represents hydrogen atom and/or an alkoxy group; a represents a number satisfying $0 < a \geq 3$; and b represents an integer of 2 or greater.

Concrete examples of the organoaluminum compound represented by $R^{22}{}_a\text{ALM}_{3-a}$ include trialkylaluminums such as trimethylaluminum, triethylaluminum, tripropylaluminum, triisobutylaluminum, trihexylaluminum and the like; dialkylaluminum hydrides such as dimethylaluminum hydride, diethylaluminum hydride, dipropylaluminum hydride, diisobutylaluminum hydride, dihexylaluminum hydride and the like; and alkylaluminum alkoxides such as dimethylaluminum methoxide, methylaluminum dimethoxide, diethylaluminum methoxide, ethylaluminum dimethoxide, diisobutylaluminum methoxide, isobutylaluminum dimethoxide, dihexylaluminum methoxide, hexylaluminum dimethoxide, dimethylaluminum ethoxide, methylaluminum diethoxide diethylaluminum ethoxide, ethylaluminum diethoxide, diisobutylaluminum ethoxide, isobutylaluminum diethoxide and the like.

Concrete examples of the aluminoxane represented by $-\text{Al}(R^{23})-\text{O}]_b$ include tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, and the like.

Per one mole of titanium atom contained in catalyst component (A), catalyst component (B) can be used in an amount so widely ranging as 1 to 100,000 moles. Preferably, however, it is used in an amount of 1 to 10,000 moles, and more preferably in an amount of 1 to 5,000 moles.

Next, the synthesis of catalyst component (A) of this invention will be mentioned.

The catalyst component (A) of this invention is synthesized by reacting titanium compound (a) with compound (b) or compound (c), and removing solid substance from the reaction mixture.

The method for reacting titanium compound (a) with compound (b) or compound (c) may be any of addition of compound (b) or compound (c) to titanium compound (a) and addition of titanium compound (a) to compound (b) or compound (c).

Preferably, compound (a) and compound (b) or compound (c) are put to use after dissolving or diluting them with an appropriate solvent.

As said solvent, aliphatic hydrocarbons such as hexane, heptane, octane, decane and the like, aromatic hydrocarbons such as toluene, xylene and the like, alicyclic hydrocarbons such as cyclohexane, methylcyclohexane, decalin and the like, and ether compounds such as diethyl ether, diisoamyl ether, tetrahydrofuran and the like can be referred to.

The reaction temperature is $-50°$ C. to $150°$ C., preferably $-30°$ C. to $120°$ C., and particularly $0°$ C to $100°$ C.

Though the reaction time is not critical, preferable reaction time is usually about 30 minutes to about 6 hours.

Compound (b) or compound (c) is used in an amount of 0.01 to 1.0, preferably 0.05 to 0.8, and particularly 0.1 to 0.6, as expressed in terms of atomic ratio of compound (b) or compound (c) to titanium atom in titanium compound (a).

The catalyst components of this invention and the catalyst system of this invention are used for production of ethylene-α-olefin copolymer. Said copolymer means a copolymer constituted of ethylene and at least one α-olefin.

Concrete examples of the α-olefin include propylene-1, butene-1, pentene-1, hexene-1, 4-methylpentene-1, octene-1, decene-1, octadecene-1, eicosene-1, and the like.

It is also possible in this invention to copolymerize a non-conjugated diene additionally for the purpose of improving the vulcanizability of copolymer. Concrete examples of said diene include dicyclopentadiene, tricyclopentadiene, 5-methyl-2,5-norbornadiene, 5-methylene-2-norbornene, 5-ethylidene-2-norbornene, 5-isopropenyl-2-norbornene, 5-(2'-butenyl)-2-norbornene, 1,5,9-cyclododecatriene, 6-methyl-4,7,8,9-tetrahydroindene, trans-1,2-divinylcyclobutane, 1,4-hexadiene, 4-methyl-1,4-hexadiene, 1,3-hexadiene, 1,6-octadiene, 6-methyl-1,5-heptadiene, and the like. This invention by no means limited by the compounds mentioned above.

The copolymer of this invention can have a density so widely ranging as 0.85 to 0.95 (g/cm³). From the viewpoint of flexibility at low temperature, its density is preferably 0.85 to 0.94, more preferably 0.85 to 0.92, and particularly 0.85 to 0.90. The copolymer of this invention is a rubbery random copolymer showing no absorption at 730 cm$^{-1}$ due to crystalline ethylene chain at all in the infrared absorption spectrum and having a narrow composition distribution.

The copolymer of this invention may comprise two or more kinds of α-olefin and two or more kinds of conjugated diene.

Next, one example of the production of the ethylene-α-olefin copolymer using the catalyst system of this invention will be mentioned.

First, on the method for feeding catalyst components into polymerization reactor, there is no restriction except that the catalyst components must be fed in a moisture-free state in an inert gas such as nitrogen, argon and the like. The catalyst components (A) and (B) may be fed either separately or after a previous mutual contact.

The polymerization can be carried out over a temperature range of −30° C. to 300° C. Preferably, however, temperature of the polymerization is −10° C. to 200° C., and particularly 20° C. to 150° C.

Though the pressure of polymerization is not critical, a pressure of about 3 atmospheres to 1,500 atmospheres is preferable from the viewpoint of industrial practicability and economical reason.

The polymerization can be carried out by any of continuous process and batch process. A slurry polymerization using an inert hydrocarbon solvent such as propane, butane, pentane, hexane, heptane, octane and the like, a liquid phase polymerization using no solvent, and a gas phase polymerization are also possible.

Further, a chain transfer agent such as hydrogen and the like may be added for the purpose of regulating molecular weight of the copolymer of this invention.

Next, this invention will be illustrated in more detail by way of the following examples and comparative examples.

In the examples, content of α-olefin, iodine number and intrinsic viscosity were measured by the following methods.

Thus, content of α-olefin was determined from the characteristic absorptions of ethylene and α-olefin by the use of infrared spectrophotometer JASCO A-302 manufactured by Nihon Bunko Kogyo K.K.

Iodine number was determined from the characteristic absorption of diene by the use of the same infrared spectrophotometer as mentioned above.

Intrinsic viscosity [η] was measured at 135° C. in tetralin with Ubbelohde viscometer.

Titanium content in the catalyst component was measured by atomic absorption analysis.

Example 1

(i) Synthesis of Catalyst Component (A)

After replacing inner atmosphere of a 300 ml flask equipped with a stirrer, a dropping funnel, a reflux condenser and a thermometer with argon gas, 23.8 ml of a hexane solution containing 5 mmoles of a titanium compound represented by $(C_8H_{17})_2N-TiCl_3$ was charged.

Then, 0.39 g (2.5 mmoles) of benzoylacetone dissolved in 10 ml of hexane was dropped from the dropping funnel into the flask over a period of 30 minutes while maintaining the temperature of the solution in flask at 75° C. After completing the dropping, the resulting mixture was further reacted at 75° C. for 6 hours.

From the mixture obtained by the above-mentioned reaction, the resulting solid substance was removed. Thus, 33.8 ml of a hexane solution containing catalyst component (A) was obtained. The quantity of titanium atom contained in the hexane solution was 0,075 mmole/ml, as determined by atomic absorption analysis.

(ii) Copolymerization of Ethylene with Propylene

After replacing inner atmosphere of a 300 ml flask equipped with a stirrer, a reflux condenser, a gas blowing tube and a thermometer with argon gas, 200 ml of heptane and 5.0 ml (5 mmoles) of triisobutylaluminum were charged. Then, a mixture of ethylene and propylene gas (composition of gas phase: $C_2'/C_3'=2/8$; composition of gas phase is expressed in terms of ratio by volume, hereinafter the same) was introduced into the solution through the gas blowing tube until a saturation was reached, after which 3.6 ml of the hexane solution containing catalyst component (A) obtained in (i) (Ti atom: 0.25 mmole) was added to start polymerization.

Thereafter, feeding of the gas mixture was continued while maintaining the temperature at 30° C. to carry out the polymerization. After one hour, 20 ml of ethanol was added to stop the polymerization.

The copolymer thus formed was three times washed with each 1,000 ml portion of a mixture comprising 950 ml of ethanol and 50 ml of 1N hydrochloric acid, and then it was dried in vacuum to obtain 5.95 g of an ethylenepropylene copolymer (hereinafter referred to as "EP copolymer"). Catalyst activity per one hour per one mole of Ti atom (hereinafter, simply referred to as "activity") was $2.4 \times 10^4$ g/mole-Ti.

In the infrared absorption spectrum of the EP copolymer thus obtained, no absorption peak of 730 cm$^{-1}$ assignable to crystalline ethylene chain (hereinafter referred to as "IR$_{730}$") was observable, demonstrating that the EP copolymer had a narrow composition distribution. Propylene content in the copolymer was 33.3% by weight, and its intrinsic viscosity (hereinafter referred to as [η]) was 3.0.

Example 2

Copolymerization of Ethylene with Butene-1

A copolymerization of ethylene with butene-1 was carried out under the same conditions as in Example 1 (ii), except that a mixture of ethylene and propylene gas was replaced with a mixture of ethylene and butene-1 gas ($C_2'/C_4'=2/8$) and the hexane solution containing catalyst component (A) was used in an amount of 1.8 ml (Ti atom: 0,125 mmole). As the result, 5.3 g of an ethylenebutene-1 copolymer (hereinafter referred to as EB copolymer) was obtained. Activity was $4.2 \times 10^4$ g/mole-Ti.

In the EB copolymer thus obtained, no IR$_{730}$ was noticeable, demonstrating narrowness of composition distribution. Butene-1 content was 40.7%, and [η] was 3.7.

Example 3

Copolymerization of Ethylene with Hexene-1

After replacing inner atmosphere of a 300 ml flask equipped with a stirrer, a reflux condenser, a gas blowing tube and a thermometer with argon gas, 200 ml of hexene-1 and 5.0 ml (5 mmoles) of triisobutylaluminum were charged into the flask. Then, ethylene gas was introduced into the solution through the blowing tube at a rate of 375 ml/min. until saturation was reached, after which 0,036 ml of the hexane solution containing catalyst component (A) obtained in Example 1 (i) (Ti atom: 0.0025 mmole) was added thereto to start a polymerization.

Thereafter, polymerization was continued for one hour, while continuing feeding of the gas at a constant temperature of 30° C., after which 20 ml of ethanol was added to stop the polymerization.

The resulting polymer was three times washed with each 1,000 ml portion of a mixture comprising 950 ml of ethanol and 50 ml of 1N hydrochloric acid and then dried in vacuum to obtain 1.9 g of an ethylene-hexene-1 copolymer (hereinafter referred to as EH copolymer). Activity was $7.7 \times 10^5$ g/mole-Ti. The EH copolymer thus obtained showed no $IR_{730}$, demonstrating narrowness of its composition distribution. Its hexene-1 content was 49.3%, and its $[\eta]$ was 6.9.

Example 4

Copolymerization of Ethylene with Decene-1

A copolymerization of ethylene with decene-1 was carried out under the same conditions as in Example 3, except that the hexene-1 was replaced with 200 ml of decene-1. As the result, 0.7 g of an ethylene-decene-1 copolymer (hereinafter referred to as ED copolymer) was obtained. Activity was $2.6 \times 10^5$ g/mole-Ti.

The ED copolymer thus obtained showed no $IR_{730}$, demonstrating narrowness of its composition distribution. Its decene-1 content was 57.3%, and its $[\eta]$ was 6.3.

Example 5

Ethylene and propylene were copolymerized under the same conditions as in Example 1, except that, in the synthesis of catalyst component (A) of Example 1 (i), the benzoylacetone was replaced with 2.5 mmoles of ethyl 3-oxobutanate. As the result, 1.3 g of EP copolymer was obtained. Activity was $1.5 \times 10^4$ g/mole-Ti.

The EP copolymer thus obtained showed no IR demonstrating narrowness of its composition distribution. Its propylene content was 31.2%, and its $[\eta]$ was 3.1.

Example 6

Ethylene and propylene were copolymerized under the same conditions as in Example 1, except that, in the synthesis of catalyst component (A) of Example 1 (i), the benzoylacetone was replaced with 2.5 mmoles of dibenzoylmethane. As the result, 3.8 g of EP copolymer was obtained. Activity was $1.5 \times 10^4$ g/mole-Ti.

The EP copolymer thus obtained showed no IR demonstrating narrowness of its composition distribution. its propylene content was 29.3%, and its $[\eta]$ was 3.2.

Example 7

A copolymerization of ethylene with propylene was carried out in the same manner as in Example 1, except that, in the ethylene-propylene copolymerization of Example 1 (ii), the triisobutylaluminum was replaced with 5 mmoles of di-isobutylaluminum methoxide and the hexane solution containing catalyst component (A) was used in an amount of 0.72 ml (Ti atom: 0.05 mmole). As the result, 5.7 g of EP copolymer was obtained. Activity was $1.1 \times 10^5$ g/mole-Ti.

The EP copolymer thus obtained showed no $IR_{730}$, demonstrating narrowness of its composition distribution. Its propylene content was 32.1%, and its $[\eta]$ was 3.4.

Example 8

A copolymerization of ethylene with propylene was carried out in the same manner as in Example 1, except that, in the ethylene-propylene copolymerization of Example 1 (ii), the triisobutylaluminum was replaced with 6.7 mmoles of methylaluminoxane and the hexane solution containing catalyst component (A) was used in an amount of 0.014 ml (Ti atom: 0,001 mmole). As the result, 0.14 g of EP copolymer was obtained. Activity was $1.0 \times 10^5$ g/mole Ti.

The EP copolymer thus obtained showed no $IR_{730}$, demonstrating narrowness of its composition distribution. Its propylene content was 33.1%, and its $[\eta]$ was 3.2.

Example 9

A copolymerization of ethylene with propylene was carried out in the same manner as in Example 1 (ii), except that catalyst component (A) was synthesized in the same manner as in Example 1 (i) by using a titanium compound represented by $(C_{10}H_{21})_2NTiCl_3$ in place of the titanium compound $(C_8H_{17})_2NTiCl_3$ and 3.6 ml of a hexane solution containing the resulting catalyst component (A) (Ti atom: 0.25 mmole) was used in the same manner as in Example 1 (ii). As the result, 3.0 g of EP copolymer was obtained. Activity was $1.1 \times 10^4$ g/mole-Ti.

The EP copolymer thus obtained showed no $IR_{730}$, demonstrating narrowness of its composition distribution. Its propylene content was 30.6%, and its $[\eta]$ was 3.0.

Example 10

Copolymerization of Ethylene with Propylene and Dicyclopentadiene

After replacing inner atmosphere of a 300 ml flask equipped with a stirrer, a reflux condenser, a gas blowing tube and a thermometer with argon gas, 200 ml of heptane, 1.24 ml (10 mmoles) of dicyclopentadiene and 5.0 ml (5 mmoles) of triisobutylaluminum were charged. Then, a mixture of ethylene and propylene gas ($C_2'/C_3'=2/8$) was introduced into the solution through the gas blowing tube until saturation was reached. The, 3.6 ml of a hexane solution containing catalyst component (A) (Ti atom: 0.25 mmole) was added to start a polymerization reaction.

Then, polymerization was carried out for one hour while continuing the feeding of the gas mixture at a constant temperature of 30° C., after which 20 ml of ethanol was added to stop the polymerization.

The resulting polymer was washed thrice with each 1,000 ml portion of a mixture comprising 950 ml of ethanol and 50 ml of 1N hydrochloric acid and then dried in vacuum to obtain 3.0 g of an ethylene-propylene- dicyclopentadiene copolymer (EPDM) Activity was $4.2 \times 10^4$ g/mole-Ti. Its propylene content was 27.0%, $[\eta]$ was 3.1, and iodine number was 12.0 (g/100 g).

Comparative Example 1

Copolymerization by the Use of Titanium Tetrachloride

Ethylene and propylene were copolymerized in the same manner as in Example 1 (ii), except that, as catalyst component (A), 0.5 mmole of titanium tetrachloride was used. As the result, 2.3 g of EP copolymer was obtained. Activity was 4,500 g/mole Ti.

The EP copolymer thus obtained showed IR$_{730}$, demonstrating broadness of its composition distribution. Its propylene content was 37.5%, and its [η] was 2.7.

Comparative Example 2

Ethylene and propylene were copolymerized in the same manner as in Example 1 (ii), except that 0.5 mmole of titanocene dichloride (Cp$_2$TiCl$_2$) was used as catalyst component (A) and 25 mmoles of aluminoxane was used in place of the triisobutylaluminum. As the result, 0.6 g of EP copolymer was obtained. Activity was 12,000 g/mole-Ti.

Although the copolymer thus obtained showed no IR$_{730}$, its propylene content was 39.9%, and its [η] was 0.29, demonstrating that this copolymer had a very low molecular weight.

Example 11

(i) Synthesis of Catalyst Component (A)

After replacing inner atmosphere of a 300 ml flask equipped with a stirrer, a dropping funnel, a reflux condenser and a thermometer with argon gas, 45.6 ml of a hexane solution containing 10 mmoles of a titanium compound represented by composition formula (C$_8$H$_{17}$)$_2$N-TiCl$_3$ was charged into the flask.

Then, 10 ml of a hexane solution containing 0.42 ml (4 mmoles) of 3-methyl-3-hydroxybutanone was dropped from the dropping funnel into the solution over a period of 30 minutes while maintaining temperature of the solution in the flask at 75° C. After dropping it, the resulting mixture was further reacted for 6 hours at 75° C.

Then, solid substance was removed from the reaction mixture. Thus, 72 ml of a hexane solution containing catalyst component (A) was obtained. The separation of solid substance from the solution was carried out by using a cylindrical filter. Concentration of titanium atom in the hexane solution was revealed as 0.046 mmole/ml by atomic absorption analysis.

(ii) Copolymerization of Ethylene with Propylene

After replacing inner atmosphere of a 300 ml flask equipped with a stirrer, a reflux condenser, a gas blowing tube and a thermometer with argon gas, 200 ml of heptane and 2.0 ml (2 mmoles) of triisobutylaluminum were charged. Then, a mixture of ethylene and propylene gas (C$_2$'/C$_3$'=2/8) was introduced into the solution through the gas blowing tube until saturation was reached, after which 4.35 ml of the hexane solution containing catalyst component (A) obtained in (i) (Ti atom: 0.2 mmole) was added to start a polymerization reaction.

Thereafter, polymerization was carried out for 10 minutes while feeding the gas mixture at a constant temperature of 30° C., and then 20 ml of ethanol was added to stop the polymerization.

The resulting polymer was washed three times with each 1,000 ml portion of a mixture comprising 950 ml of ethanol and 50 ml of 1N hydrochloric acid and then dried in vacuum to obtain 3.45 g of an EP copolymer. Activity was 1.0×10$^5$ g/mole-Ti.

The EP copolymer thus obtained showed no IR$_{730}$, demonstrating narrowness of its composition distribution. Its propylene content was 33.3% by weight, and its [η] was 3.0.

During the polymerization, a polymer insoluble in the solvent used in polymerization was deposited. Its weight fraction (hereinafter referred to as HIP (%)) was 0.1%. However, no adhesion to stirring wheel was observed.

Example 12

Ethylene and propylene were copolymerized under the same conditions as in Example 11, except that the 3-methyl-3-hydroxybutanone was replaced with 6.51 ml (0.2 mmole) of 3-methyl-4-hydroxybutanone in Example 11 (i). As the result, 2.59 g of EP copolymer was obtained. Activity was 4.6×10$^4$ g/mole-Ti.

The polymer thus obtained showed no IR$_{730}$, demonstrating narrowness of its composition distribution. Its propylene content was 40.7%, and its [η] was 3.7.

During the copolymerization, deposition of HIP was observed in a quantity of 1.5%. However, no adhesion to stirring wheel was observed.

What is claimed is:

1. A process for producing ethylene-α-olefin copolymers having no absorption peak at 730 cm$^{-1}$ in its infrared absorption spectrum which comprises copolymerizing ethylene with at least one α-olefin in the presence of a catalyst system comprising:

(A) a liquid catalyst component obtained by reacting:
(a) a titanium compound represented by the formula:

$$(R^1R^2N)_nTiCl_{4-n}$$

wherein R$^1$ and R$^2$ are the same as or different from each other, and each represents a hydrocarbon group having 8 to 10 carbon atoms. and n is a number satisfying 1≦n≦2; with (b) at least one compound selected from the compounds represented by the formula:

$$R^3-CO-CH_2-CO-R^4$$

wherein R$^3$ and R$^4$ are the same as or different from each other and each represents a hydrocarbon group having 1 to 6 carbon atoms or an alkoxy group having 1 to 6 carbon atoms; or with (c) at least one compound selected from the group consisting of the ketoalcohols represented by the formulas (I). (II) and (V):

(I)

wherein R$^5$, R$^6$ and R$^7$ are the same as or different from each other; and each represents a hydrocarbon group having 1 to 6 carbon atoms;

(II)

wherein R$^8$ represents a hydrocarbon group having 1 to 6 carbon atoms; R$^9$ and R$^{10}$ are the same as or different from each other and each represents a hydrogen atom or a hydrocarbon group having 1 to 6 carbon atoms;

and E represents a hydrocarbon group having 1 to 2 carbon atoms:

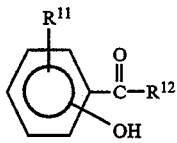 (V)

wherein $R^{11}$ represents a hydrogen atom or a hydrocarbon group having 1 to 6 carbon atoms, and $R^{12}$ represents a hydrocarbon group having 1 to 6 carbon atoms,
  in such a proportion that the amount of the compound (b) or the compound (c) is 0.1 to 0.6 mole per mole of the titanium atom contained in the titanium compound (a); and
(b) an organoaluminum compound at a temperature of −30° C. to 100° C. under a pressure of about 3 atmospheres to 1.500 atmospheres.

2. A process according to claim 1, wherein the α-olefin is propylene, butene-1, pentene-1, hexene-1, 4-methylpentene-1, octene-1, decene-1, octadecene-1, or eicocene-1.

3. A process according to claim 1, wherein a non-conjugated diene is copolymerized.

4. A process according to claim 1, wherein the density of the ethylene-α-olefin copolymer is 0.85–0.95 g/cm$^3$.

5. A process according to claim 1, wherein the reaction of the titanium compound (a) with the compound (b) or the compound (c) is carried out at −50° to 150° C. for 30 min. to 6 hours.

6. A process according to claim 1, wherein an amount of the organoaluminum component (B) is 1 to 100,000 moles per one mole of titanium atom contained in the liquid catalyst component (A).

7. A process according to claim 1, wherein the titanium compound (a) is reacted with at least one compound selected from the group consisting of benzoylactone, ethyl 3-oxobutanate, dibenzoylmethane, 3-methyl-3-hydroxybutanone, 3-methyl-4-hydroxybutanone and 2-hydroxyacetophenone.

* * * * *